United States Patent [19]
Wolrich et al.

[11] Patent Number: 5,867,407
[45] Date of Patent: Feb. 2, 1999

[54] NORMALIZATION SHIFT PREDICTION INDEPENDENT OF OPERAND SUBSTRACTION

[75] Inventors: Gilbert M. Wolrich, Framingham; Timothy C. Fischer, Boxboro; John J. Ellis, Abington, all of Mass.

[73] Assignee: Digital Equipment Corporation, Maynard, Mass.

[21] Appl. No.: 955,087

[22] Filed: Oct. 21, 1997

Related U.S. Application Data

[63] Continuation of Ser. No. 497,013, Jun. 30, 1995, abandoned.
[51] Int. Cl.$^6$ ........................................ G06F 5/01
[52] U.S. Cl. ........................................ 364/715.04
[58] Field of Search ................ 364/715.04, 748.01

[56] References Cited

U.S. PATENT DOCUMENTS

| | | | |
|---|---|---|---|
| 4,758,974 | 7/1988 | Fields et al. | 364/748 |
| 4,922,446 | 5/1990 | Zurawski et al. | 364/748 |
| 5,204,825 | 4/1993 | Ng | 364/715.04 |
| 5,282,156 | 1/1994 | Miyoshi et al. | 364/748 |
| 5,317,527 | 5/1994 | Britton et al. | 364/715.04 |
| 5,343,413 | 8/1994 | Inoue | 364/715.04 |
| 5,392,228 | 2/1995 | Burgess et al. | 364/715.04 |

*Primary Examiner*—David H. Malzahn

[57] ABSTRACT

A pipelined floating point processor including an add pipe for performing floating point additions is described. The add pipe includes a circuit to predict a normalization shift amount from examination of input operands, a circuit to determine the "Sticky bit" from the input operands, and a rounding adder which adds a pair of operands and rounds the result in a single pipeline stage operation. The rounding adder incorporates effects due to rounding in select logic for a series of carry select adders. The adder also aligns the datapath to permit economical storage and retrieval of floating point and integer operands for floating point or conversions operations. The floating point processor also includes in the adder pipeline a divider circuit include a quotient register having overflow quotient bit positions to detect the end of a division operation.

21 Claims, 11 Drawing Sheets

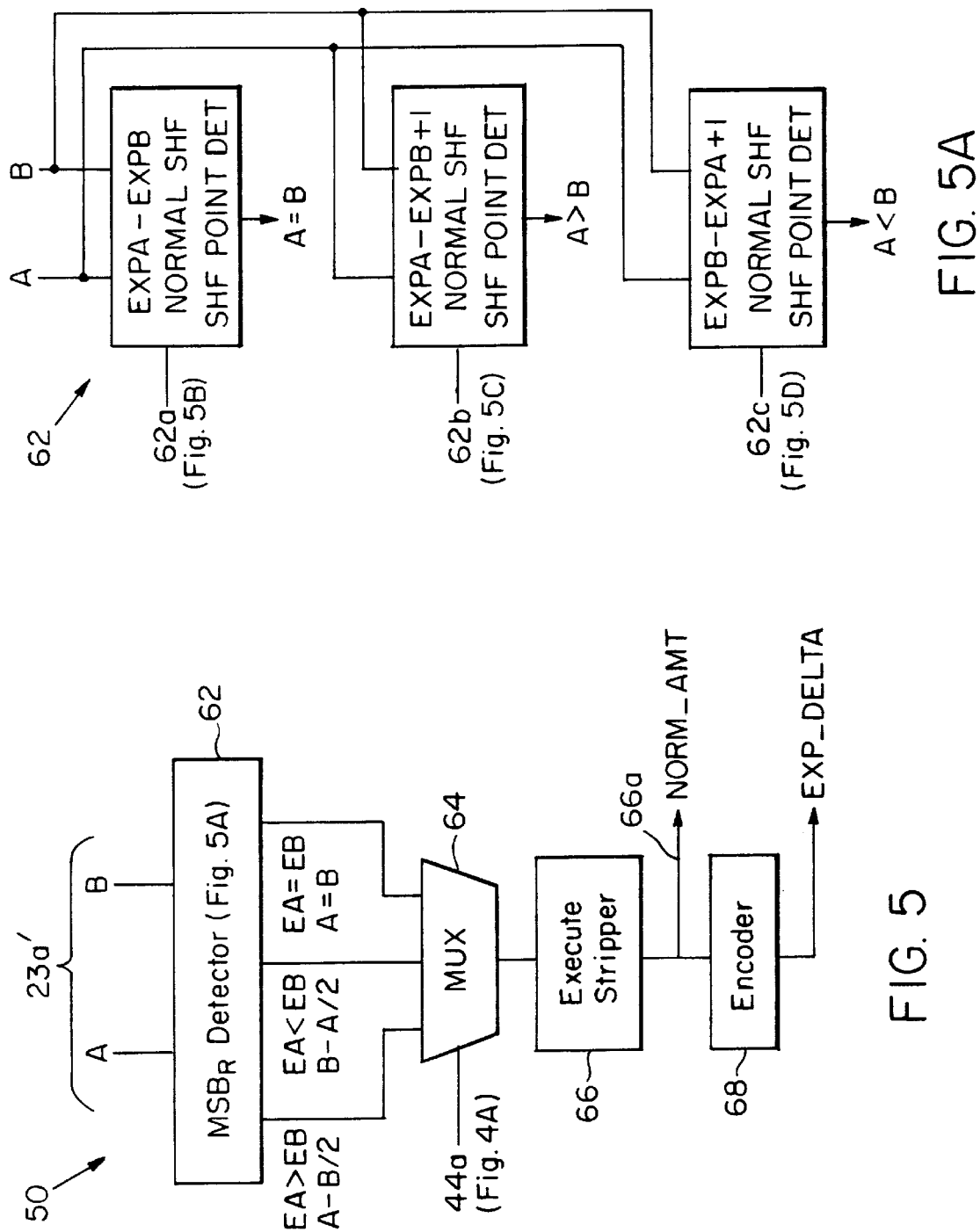

NORMALIZATION SHIFT PREDICTION INDEPENDENT OF OPERAND SUBSTRACTION

This application is a continuation of application Ser. No. 08/497,013, filed Jun. 30, 1995, now abandoned.

BACKGROUND OF THE INVENTION

This invention relates generally to floating-point processors used in computers, and more particularly to a method and apparatus for normalizing floating-point numbers.

As it is known in the art, many applications in computers require the use of numbers that are not integers. There are several ways in which non-integers may be represented in computers. The most common approach is the use of so called floating-point numbers in which a number is divided into separate sections or registers. One section is a fraction, which represents the precision of a number, and another section is an exponent which represents in base two, the power to which the representation is raised. A third section of one bit contains the sign bit.

One of the most common operations performed in a floating-point processor is the addition or subtraction of two floating-point numbers or operands. The addition or subtraction of two floating-point numbers requires that the numbers are provided with the same exponent before the fractional parts can be added or subtracted. This is generally referred to as alignment when the fractional part of one of the operands to be added is shifted a predetermined number of bits in accordance with an exponent difference. Generally, the floating point operands or results are stored in normalized form. That is, the fractional part of the floating point number is shifted and the exponent is adjusted so that the MSB of the fraction is a logic "1".

Several approaches are known for normalizing numbers. One approach is to determine the normalization shift amount by finding the leading one for positive results or leading zero for negative results of the fraction adder-subtract unit output. One problem with this approach, however, is that the normalization shift is not determined until after the addition or subtraction is performed on the input operands. Accordingly, there is a delay from the time when the fractional adder-subtract unit provides a valid output to the time when the normalization shift could actually be performed.

One technique which avoids some of the delay inherent in this approach is described in U. S. Pat. No. 4,922,446 by Zurawski et al and assigned to the assignee of the present invention. In this patent, the delay is reduced by determining two possible normalization shift amounts for the fraction adder-subtract result based on the inputs to the fraction adder-subtract result and the sign of the fraction subtract result. This technique employs a low precision adder which operates on a preselected number of the most significant bits of the input operands prior to and after alignment to determine an approximation of the true result sufficient to approximate the normalization shift amount. Although this approach provides an improvement in minimizing the amount of delay occasioned from the time that the normalization shift prediction amount is available to the fractional add or subtracted result from the adder-subtracter, the approach, nevertheless, still has a certain amount of delay and is required to operate on the inputs to the fractional adder-subtracter and not on the input operands themselves. Thus, the normalization shift still requires a sufficient period of time to complete while awaiting the prediction result.

Another technique is described in U.S. Pat. No. 5,317,527 by Britton et. al. and also assigned to the assignee of the present invention. This approach uses two scan circuits which are used to scan the input which is being subtracted. The scan circuits search from MSB to LSB for possible leading "1" and leading "0" bit positions, with different searches being done for positive, negative and zero input operands. Although this approach provides an improvement in minimizing the amount of delay occasioned from the time that the normalization shift prediction amount is available to the fractional add or subtracted result from the adder-subtracter, the approach, nevertheless, still has a certain amount of delay and is required to operate on the inputs to the fractional adder-subtracter and not on the input operands themselves. Most importantly, this approach as with the prior approach requires the sign of the fraction subtraction result to determine which prediction of the normalized shift amount i.e. the leading one or leading zero is the correct one. Thus, the determination of the normalization shift amount does not start until the subtract operands are selected by determining a possible one bit alignment, and can not complete until the sign of the subtract itself has been determined.

SUMMARY OF THE INVENTION

In accordance with the present invention, a method of predicting the normalization shift includes the step of determining for each bit position of a pair of input operands which are to be added or subtracted, a trigger position and a borrow position which can qualify as a left-shift point, for an input operand having an exponent equal to a second input operand, the first input operand having an exponent greater than the second input operand and the first input operand having an exponent less than the second input operand. With such an arrangement, the approach operates only on the input operands thus minimizing the latency at which the normalization shift prediction is available. Thus, a shift vector can be completely determined without knowledge of the sign of a subtract result to determine a shift direction or a shift amount. Thus, this approach provides minimal latency in the implementation of floating point add-subtract operations which require a normalization shift.

In accordance with a further aspect of the present invention, an apparatus for determining a normalization prediction shift amount includes means for providing a first shift vector by examining each corresponding bit position of a pair of input operands to ascertain a trigger or borrow position on a bit-by-bit basis that qualify as a true left shift point in the first shift vector assuming that the pair of input operands have equal exponents and means for providing a second shift vector by examining each corresponding bit position of the pair of input operands to ascertain a trigger or borrow position on a bit-by-bit basis that can qualify as a true left shift point in the second shift vector assuming the pair of input operands are not equal. The apparatus further includes means for selecting between said shift vectors in accordance with a signal related to a predicted exponent difference between the pair of input operands. With such an arrangement an apparatus is provided to determine a normalization shift amount and a shift direction in response to the input operands fed to the apparatus. Thus, this approach provides minimal latency in the implementation of floating point add-subtract operations which require a normalization shift.

BRIEF DESCRIPTION OF THE DRAWINGS

The foregoing features and other aspects of the invention will now become apparent when viewed with the accompanying description taken in conjunction with the accompanying drawings in which:

FIG. 5 is a block diagram of a normalization shift prediction circuit used in the portion of add pipe of FIG. 4A;

FIGS. 5A to 5D are diagrams showing details of a detector used in the normalization shift prediction circuit of FIG. 5;

DESCRIPTION OF PREFERRED EMBODIMENTS

Introduction

Figure 1:
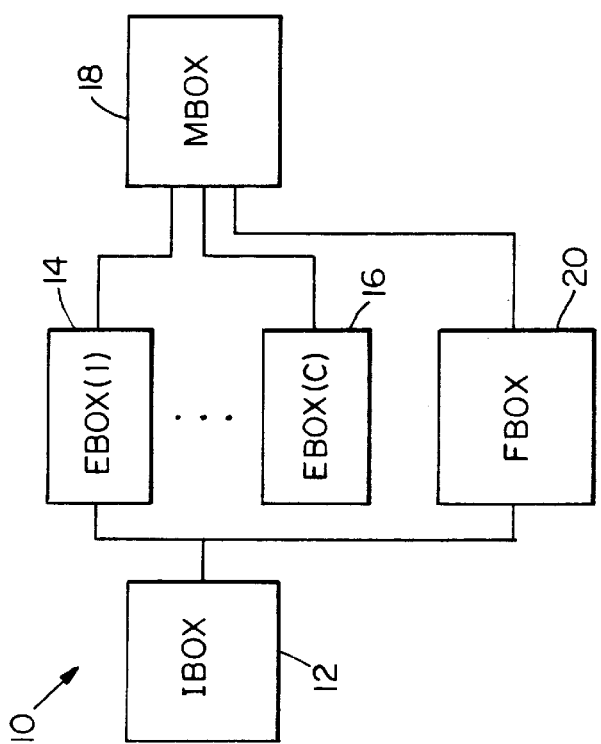
FIG. 1 is a simplified block diagram of a microprocessor.
Figure 4:
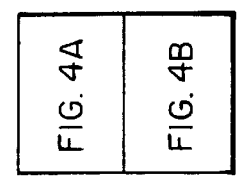
FIG. 4 is a diagram showing the relationship between FIGS. 4A and 4B.

Referring now to FIG. 1, a processor 10 is shown to include an IBOX 12 that is an instruction issue box which issues instructions fetched from a memory (not shown) to a plurality of execution boxes here two integer, execution boxes 14–16, as shown, or to a floating point processor execution box 20. An MBOX 18 that is a memory management control box determines the physical memory address for instruction and data fetches to memory. The execution boxes 14, 16, 20 include arithmetic logic units (not shown) and general purpose register files (not shown). Results stored in the general purpose register files from each of the execution boxes are written to a memory box 18 which also includes data caches, write buffers, memory management and datapath to memory as well as other circuits as necessary to interface the processor to memory (not shown).

Illustratively, the processor 10 is of a RISC (reduced instruction set computer) architecture, or alternatively could be a CISC (complex instruction set computer) architecture. Moreover, the processor 10 includes the instruction box 12 which has the capability of issuing four instructions per issue cycle. Two of those instructions can be floating-point instructions which are sent to the FBOX 20 whereas the other two of the instructions can be integer or memory reference instructions which are issued to EBOX 14 and EBOX 16 or to the MBOX 18.

Add and Mul Pipes

Figure 2:
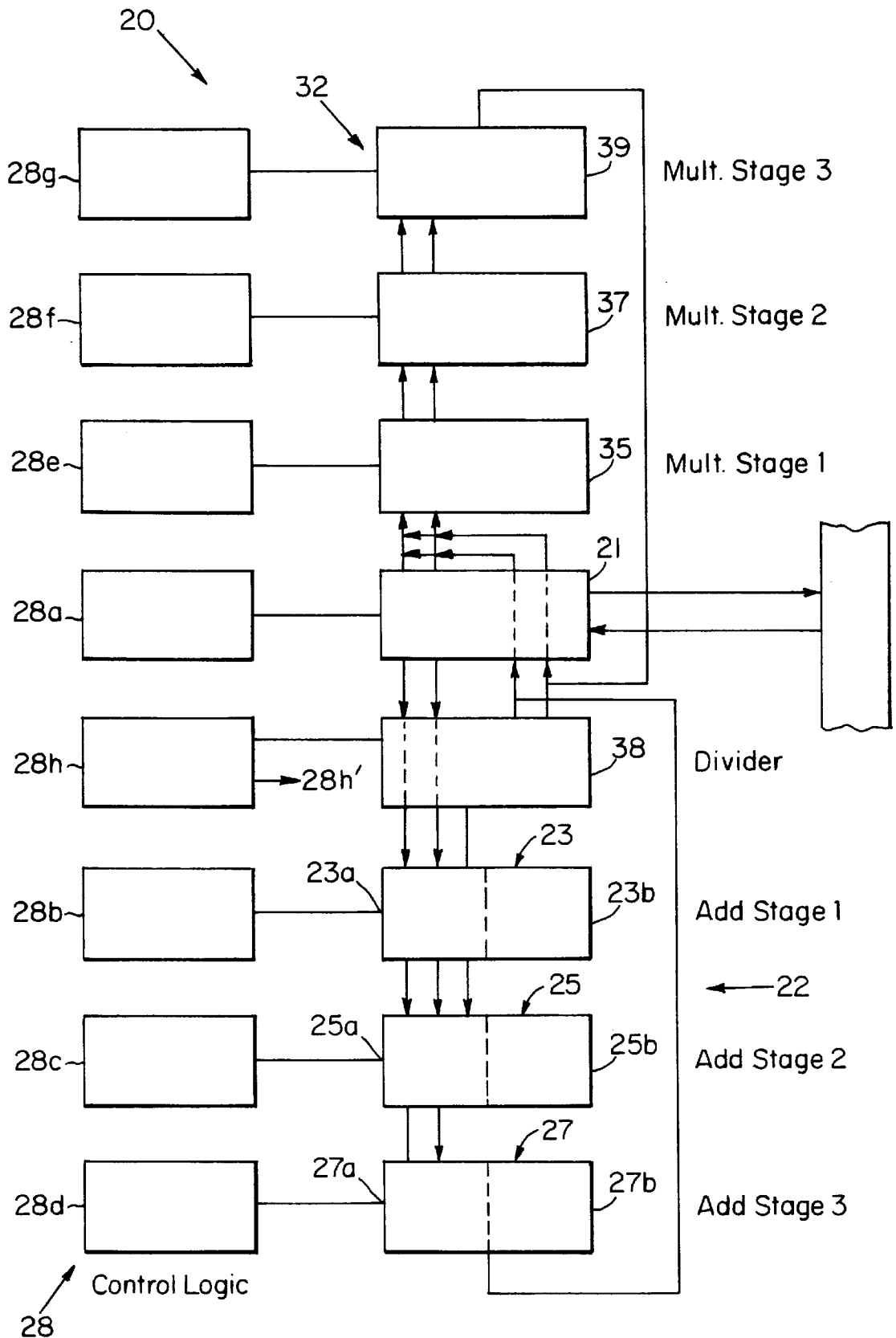
FIG. 2 is a block diagram of a floating point execution box used in the microprocessor of FIG. 1.

Referring now to FIG. 2, the floating-point execution box 20 is shown to include a register file 21 and control logic 28a–28h. The control logic 28a–28h is responsive to floating-point instructions provided from the IBOX 12 and provides control signals to each stage of an addition/subtraction pipe 22 and multiply pipe 32 as shown. The control logic stages 28a to 28h also provide control signals to store and load register contents from the register file 21 to/from the addition/subtraction pipe 22 and the multiplier pipe 32 as shown.

The control logic also processes a sign bit for calculations in the addition/subtraction pipe 22. There is a circuit which in accordance with the instruction and the relative magnitude of the operands forms a sign bit S.

The addition/subtraction pipe 22 is comprised of three stages used to provide a floating point addition or subtraction and a stage to provide a floating point division. The addition/subtraction function is provided in pipeline stages 23, 25, and 27. Add stage 23 (ADD STAGE 1) is used to provide a normalization shift prediction for the operands and to adjust the operands to ensure that the exponents are the same for addition/subtraction operations. The adder stage 25 (ADD STAGE 2) implements either an alignment shift or the normalization shift as determined in stage 1 and detects and provides a prediction for a sticky bit.

The adder stage 27 (ADD STAGE 3) performs the addition or effective subtraction on a pair of operands provided from stage 2 and also provides a rounded normalized result for those operations. That is the rounding operation is automatically performed by a rounding adder in stage 3 during the addition/subtraction of the input operands A and B in accordance with the rounding mode determined by the floating point instruction.

Each of the add stages 23, 25 and 27 have a portion respectively 23a, 25a and 27a which is used to calculate the fractional part of the resulting addition or subtraction operation, and a portion 23b, 25b and 27b which is used to calculate the exponent portion of the resulting operation. The results from the add or effective subtraction operation which are calculated in stage 3 are fed back to the register file 21 for storage in the appropriate floating-point register in accordance with the destination specified in the instruction. Stage 23 of the add pipe 22 requires one cycle, stage 25 requires 1.5 cycles and stage 27 requires 1.5 cycles for execution. In the add pipe the cycles are referenced as cycles 5, 6, 7 and 8 with each cycle having two phases 5A, 5B; 6A, 6B; 7A, 7B and 8A, 8B.

The multiply pipe 32 includes three stages 35, 37 and 39 with each stage being broken into fractional or mantissa portions 35a to 39a and exponent portions 35b to 39b. The first multiply stage 35 includes an adder used to produce a multiple of three times the multiplicand operand. Multiply stage 1 (35) also determines the booth recoding of the multiplier necessary to select the partial products to be summed in stage 2 (37) of the multiply pipe, and the number of trailing zeroes in both the multiplicand and the multiplier in order to calculate the sticky bit for multiplication. Multiply pipe stage 2 (37) includes an array of partial product selectors and carry save adders which determines the product in redundant form, i.e. a sum binary number and carry binary number which when added result in a single binary number. Multiply pipe stage 39 determines the result by adding the sum and carry output with the rounding mode and sticky bit.

Data Path Alignment

Figure 3:
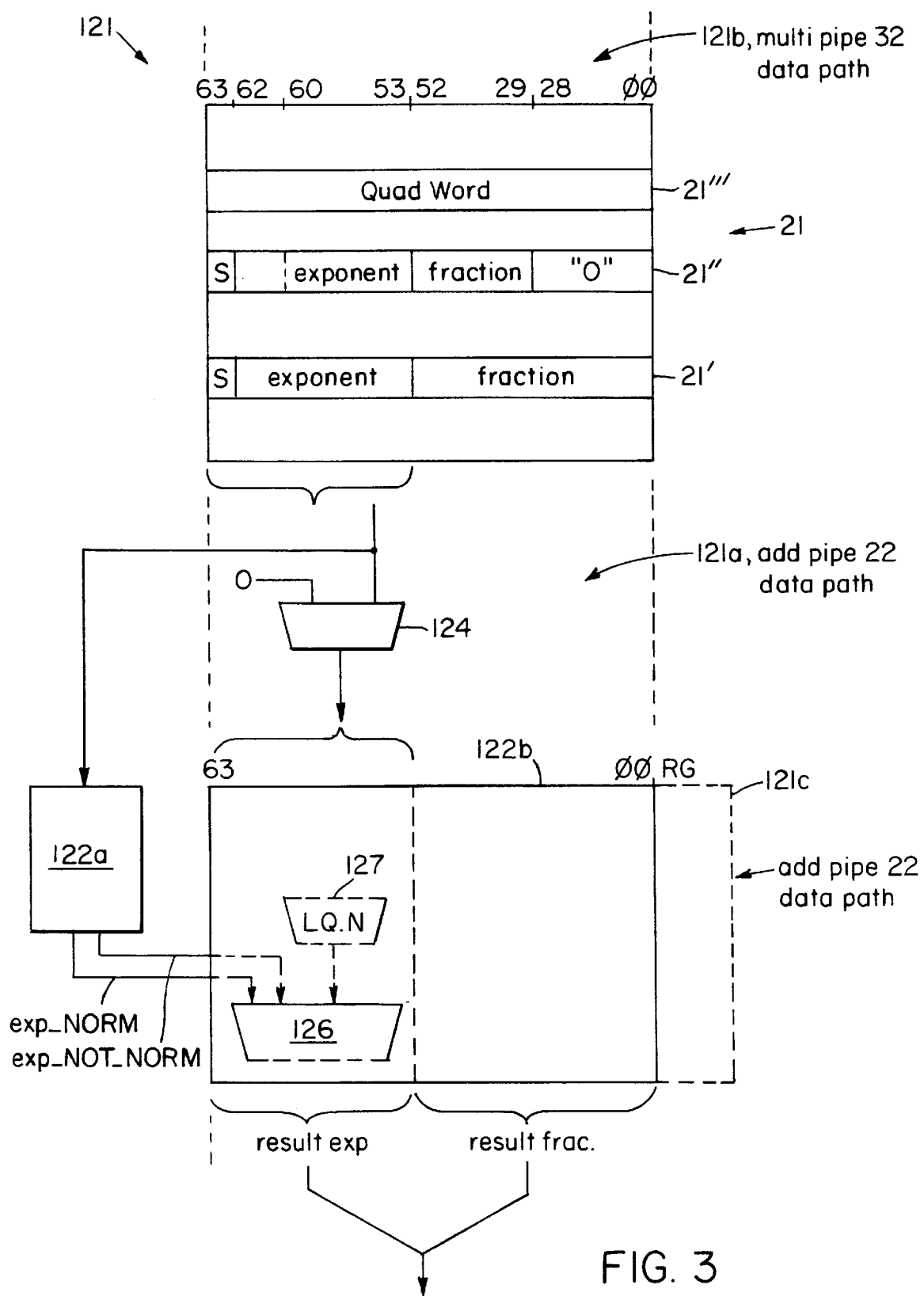
FIG. 3 is a block diagram of a portion of a data path of the floating point processor of FIG. 2 including a register file.

Referring now to FIG. 3, a portion of the data path 121 in the floating point processor is shown. The data path 121 has a add pipe portion 121a and an multiply pipe portion 121b with the register file 21 coupled between the multiply and add pipes as shown.

The data path 121a of the add pipe 22 is shown divided into three sections: a sign/exponent section 122a, a fraction section 122b, and a round/guard bit section 122c. As also shown, the register file 21 can store or deliver data with several different formats. One pair of formats is for single and double precision floating point numbers and the other pair is for long and quad word integers.

For a double precision floating point number, the fractional part of the number occupies bit positions 00 to 51, with the exponent portion occupying bit positions 52 to 62 and the sign occupying bit position 63, as illustrated by entry 21' in register file 21. For a single precision the fractional part occupies bit positions 29 to 51 and the exponent is expanded to 11 bits and occupies bit positions 52 to 62 The sign bit occupies bit position 63 as illustrated by entry 21". For floating point single precision the exponent is expanded from 8 bits in memory format to 11 bits in register format. Register format is provided by inserting the MSB of the exponent into bit position 62, and the complement of the exponent MSB into bit positions <61:59>, unless all of the bits are zero in which case zeros are filled in. For single precision fraction bit positions <28:0> are zeroed.

The fraction bit 00 or LSB in the register file is aligned with the data bit position 00 or LSB in the data path, as is each succeeding bit in the fraction. The exponent and sign bit positions are coupled to the bit positions in the exponent/sign portion 121a of the data path 121, as shown. Multiplexer 124 is used to place a one into bit position 52 (the hidden bit) and zeros into bit positions 53 to 63 for floating point operations while the sign and exponent portions of a floating point number are fed to the exponent/sign portion 122a of the data path 121.

For conversions from quad or long words to floating point the bits are aligned directly such that bit position 00 goes to bit position 00 in the data path and bit positions 52 to 63 go to data path positions 52 to 63 via multiplexer 124. At the end of the add pipe data path portion 121a is a second multiplexing function 126 which is here built into the add pipe round adder of the last stage of the add pipe. Alternatively, a separate multiplexer can be used. This second multiplexing function permits the exponent and sign data to be concatenated with the fraction data and stored back into the register file 21 as an entry similar to 21' or 21".

For integer operand types (Q or L words) multiplexer 126 provides the more significant bits of the result as described below. Thus, the second multiplexing function 126 can select either bits from the round adder (stage 3) for integers or an exponent provided as a result of a normalized operation or an exponent provided from a non-normalized operation for floating point numbers. A small multiplexer 127 is provided at the bit positions <62:59> to select between L (longword) and Q (quadword) destination formats. For Q destination types the round adder bits pass directly through multiplexer 127, but for L type destinations round adder output 60 is driven to mux bit 62 and mux bits <61:59> are zeroed.

For a quad word as illustrated by 21''', the quad word occupies bit positions 00 to 63, as shown. The data from the register file 21 is aligned with the positions in the data path. Thus bit position 00 in the register file occupies bit position 00 in the data path and bit position 63 in the register file occupies bit position 63 in the data path. With quad words the integer result is selected in multiplexer 126.

The data path also include two additional bit positions. One of the positions is for a round bit (R) or one bit position less significant than the LSB of a data word which here is bit position 00 (which is also referred to herein as the context indicates as the L bit). The second additional bit position is for a guard bit (G) or two bit positions less significant than the LSB of a data word. As used herein there is a K bit which is one bit position more significant than the LSB or L bit position. The K, L, R, and G bit positions are extensively referred to hereinafter particularly with respect to the Sticky bit logic and the rounding adder.

With the above alignment of the register file and the data path the extra formatting generally required in prior approaches is eliminated. Thus, the propagation delay inherent with prior approaches is reduced and the amount of chip area required for data type formatting multiplexers is reduced. Moreover, the arrangement still provides the capability of maintaining bit positions beyond the LSB bit position of the data path.

Add Pipe

Figure 4A:
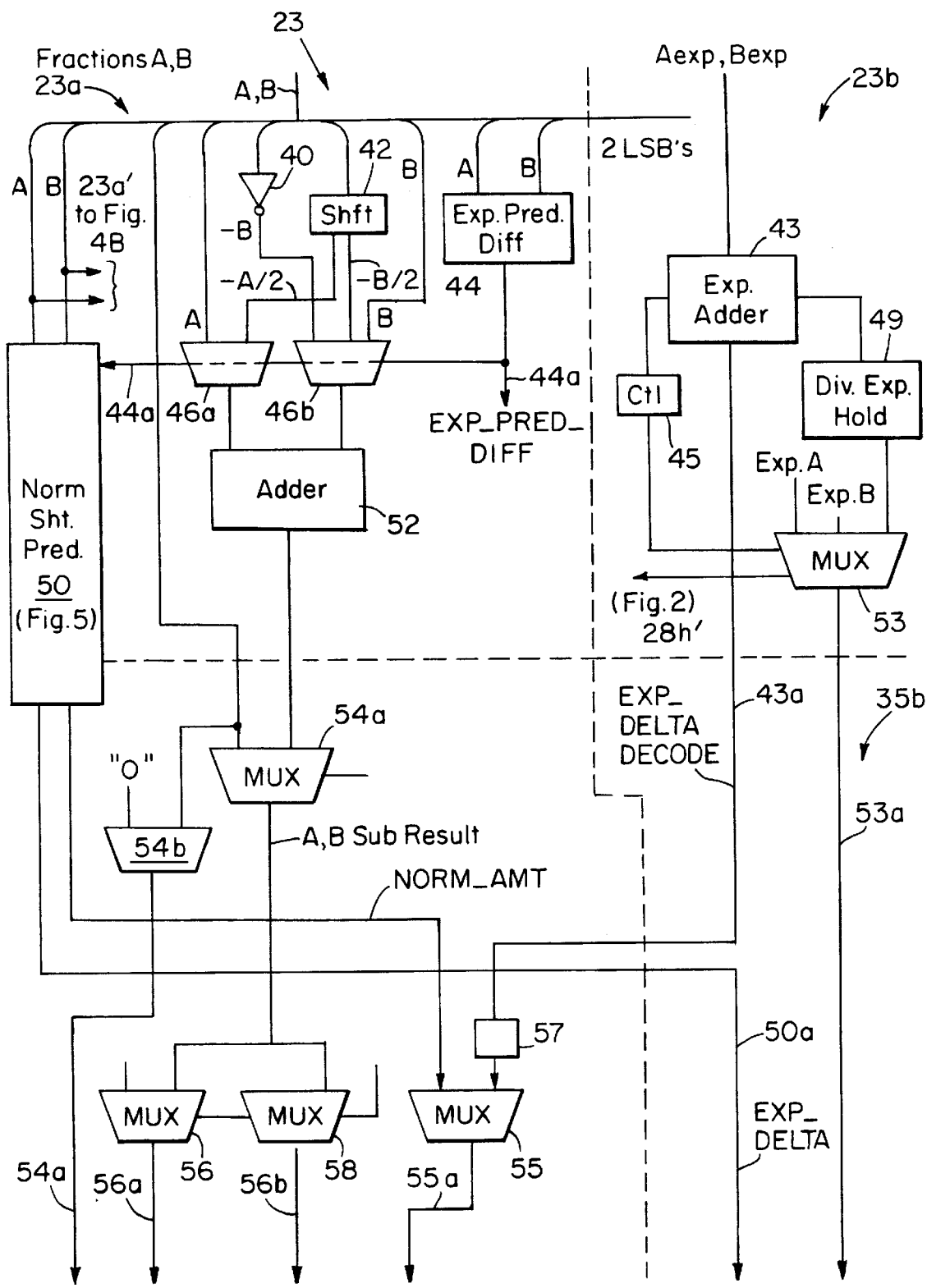
FIGS. 4A and 4B are block diagrams of an add pipe used in the floating-point processor of FIG. 2.

Referring now to FIG. 4A, the add pipe stage 23a is shown to include a pair of multiplexers 46a, 46b which are used to select the inputs for the add pipe stage 23 for predictive subtraction. Multiplexer 46b is used to select the B operand for adder 52 and has as selectable inputs B, −B/2 from shifter 42 and −B. Multiplexer 46a is used to select the A operand for adder 52 and has as selectable inputs A and −A/2. Adder 52 is thus used to perform one of three possible predictive subtracts, A−B, A−B/2, or −A/2+B as determined by multiplexers 46a, 46b and shifter 42.

The multiplexers 46a and 46b have as a select or control inputs thereto, an output of an exponent prediction difference predictor 44 which examines the two least significant bits of the exponent portion of operands A and B to determine the expected exponent difference assuming the actual exponent difference is either 0 or ±1.

Adder circuit 52 is used to provide a predicted subtraction of the fractional parts of the input operands should the exponent difference be zero or ±1 and the operation be an effective subtraction operation. Similarly, the input operands A and B are fed to a normalization shift prediction circuit 50 as will be further described in conjunction with FIG. 5.

Multiplexer 54a chooses either the fractional parts of the A and B operands or the result of the effective subtract from adder 52 to couple to a pair of multiplexers 56 and 58 as shown. A second multiplexer 54b is used to select either the fractional parts of the A or B operands or all zeros for effective subtracts with an exponent difference of 0 or 1 and provides one of the inputs to a half adder in stage 25. The pair of multiplexers 54a and 54b provide the inputs to the shifter 70. The pair of multiplexers 56 and 58 permit the operands to be loaded either in the high or low portion of the shifter 70 such that a right shift or an effective left shift can be accomplished in accordance with whether the data is loaded in the high or low section of the shifter input register.

The normalization shift prediction circuit 50 provides at an output thereof, a 64 bit signal NORM_AMT having a single bit set which indicates the expected bit position of the predicted subtraction highest order fraction bit and thus indicates the left shift amount required to normalize the subtraction result. The 64 bit signal NORM_AMT is encoded into a 7 bit signal EXP_DELTA in order to subtract the normalization shift amount from the exponent portion of the result. Signal EXP_DELTA is fed to a multiplexer 71 (FIG. 4B) in the exponent portion 25b of the second add stage 25. The vector NORM_AMT (from the exponent stage portion 25b) is one input to a shift select multiplexer 55. A vector EXP_DELTA_DECODE is decoded in a decoder 57 and the output of the decoder is the second input to shift control multiplexer 55 The NORM_AMT vector determines the shift amount when the operation performed is an effective subtraction and the exponent difference is 0 or 1 or a quad word type source operand is being converted to a floating point designation. Otherwise the shift amount is determined by decoding the EXP_DELTA_DECODE vector. For floating point add and subtract operations EXP_DELTA_DECODE <5:0> are the LSB's of the exponent difference EXP_A−EXP_B from exponent adder 43 with EXP_DELTA_DECODE <6> being the sign of the exponent difference from control 45.

In accordance with the value of the control signal fed to multiplexer 55, either the normalization shift amount signal NORM_AMT or the exponent difference amount EXP_DELTA_DECODE determines the shift control for shifter 70. Thus, mux 55 provides a shift amount which has one bit of the vector set and is used for a normalization shift for effective subtraction operations with an exponent difference of 0 or 1 or an alignment shift amount for other operations. Multiplexer 53 is fed by the A exp, B exp, and the exponent difference from the Exp adder 43 stored in a register 49 and available for the divider 38 (FIG. 2). Multiplexer 53 is controlled by the sign bit from control 45 and a signal on line 28*h*' generated by the control logic (FIG. 2) indicating that a divide operation needs the exponent.

Figure 4B:
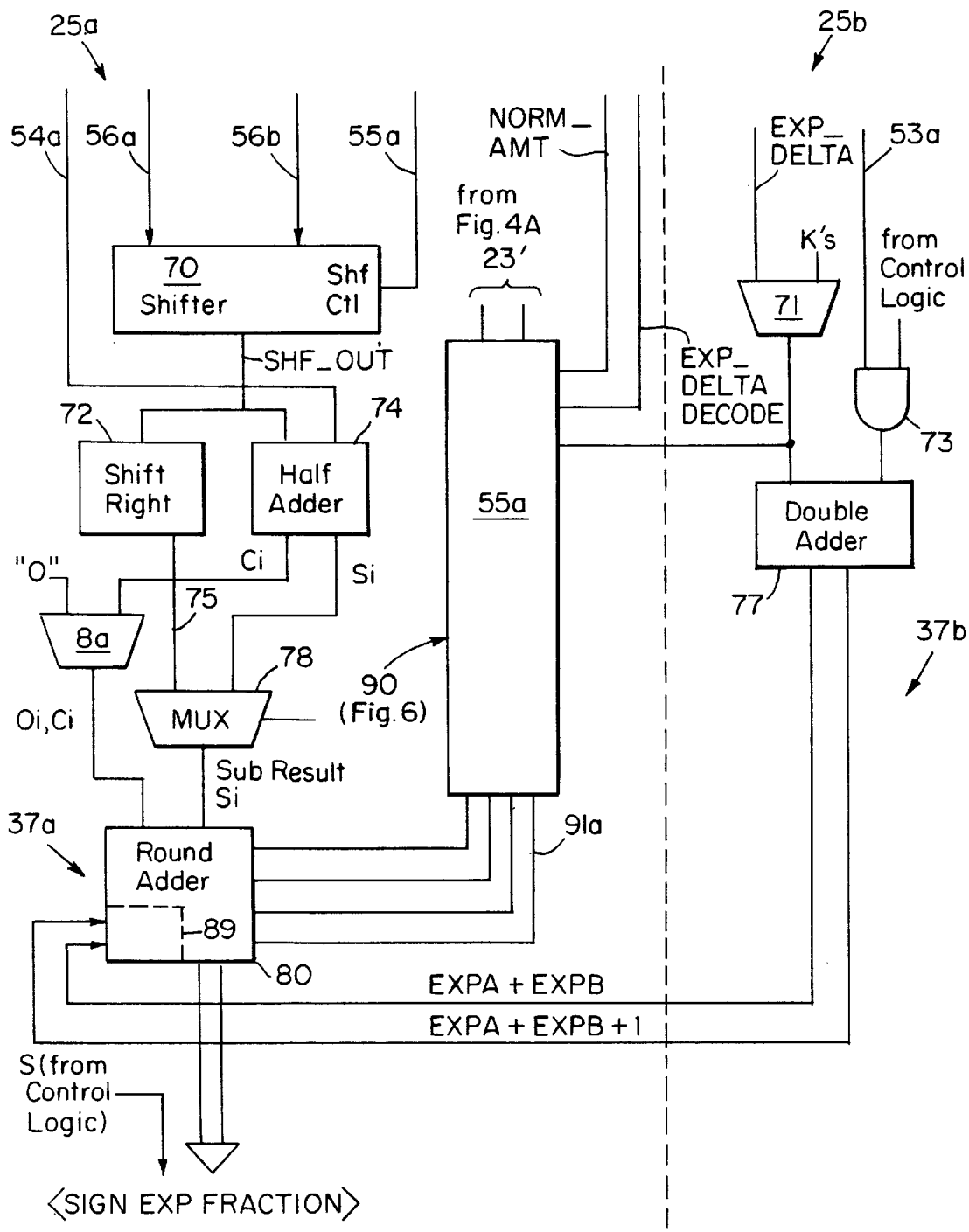

Referring now to FIG. 4B, the shift control vector is fed along line 55*a* to the shifter 70. A 128 bit vector, bits <127:64> from multiplexer 56, and bits <63:0> from multiplexer 58 are provided to the shifter 70 input. The 128 bit shifter input is right shifted from 0 to 63 as determined by the shift control vector. The shifter output is a 66 bit vector, shift_out <63:0, R, G> where R is round bit and G is the guard bit. Loading shift input data into the high section of the shifter input vector (bits <127:64>) and zeros into the low section (bits <63:0>) produces a shifter output that has left shifted shifter input bits <127:64> by 64 minus the shift amount. For right shifts, bits <63:0> of the input data are driven from multiplexer 58 with the operand which is to be shifted. Shifter input bits <127:64> from multiplexer (mux) 56 are driven either with zeros for normal right shifts, or with the replicated value of the bit <63> of mux 58 for sign extended right shifts.

Shifter 70 effectively left shifts the predicted subtraction operation result or right shifts the smaller of the operands A and B for alignment operations as provided from multiplexers 56 and 58. By loading shifter 70 to selectively place data in the high end or the low end of the shifter 70, the shifter can shift right or effectively shift left. Shifter 70 shifts the selected input operand, a predetermined amount in accordance with the value of the signal fed to lines 55*a* and provides at the output thereof a selected one of normalized predicted subtraction results or aligned operands A or B.

The normalized or aligned selected one of operands A and B is fed to a half adder 74. The half adder 74 is used for addition operations and is not used for predictive effective subtraction operations.

The right shift circuit 72 is used to shift the result of the effective subtraction ten places to align the hidden bit with the bit 52 of the data thus completing the normalization shift. For the CVTFQ instruction the output of the left shift operation is intended to align with bit 63 of the data path and therefore does not require circuit 72. The shifting here does not incur a significant delay penalty since the half adder 74 is not required for predictive effective subtracts as the round adder has only one non-zero input. The half adder 74 is fed by the fractional parts of the A and B operands and is used to propagate a carry out of the guard bit positions. The half adder 74 produces sum and carries for each bit position. The outputs from the right shift circuit 72 and half adder 74 are fed to multiplexer 78. The multiplexer 78 selects either the sum signal outputs from the half adder 74 or the shifter 75 for predictive effective subtracts. The output of the multiplexer 78 is fed to one input of round adder 80. The second input of round adder 80 is provided from a multiplexer 78*a* which contains the carry bits from the half adder 74 for addition operations or zeros for conversions and effective subtraction operations. This simplifies the KLRG logic in the round adder without any cost in pipeline cycle period while permitting the KLRG logic to be faster.

Figure 6:
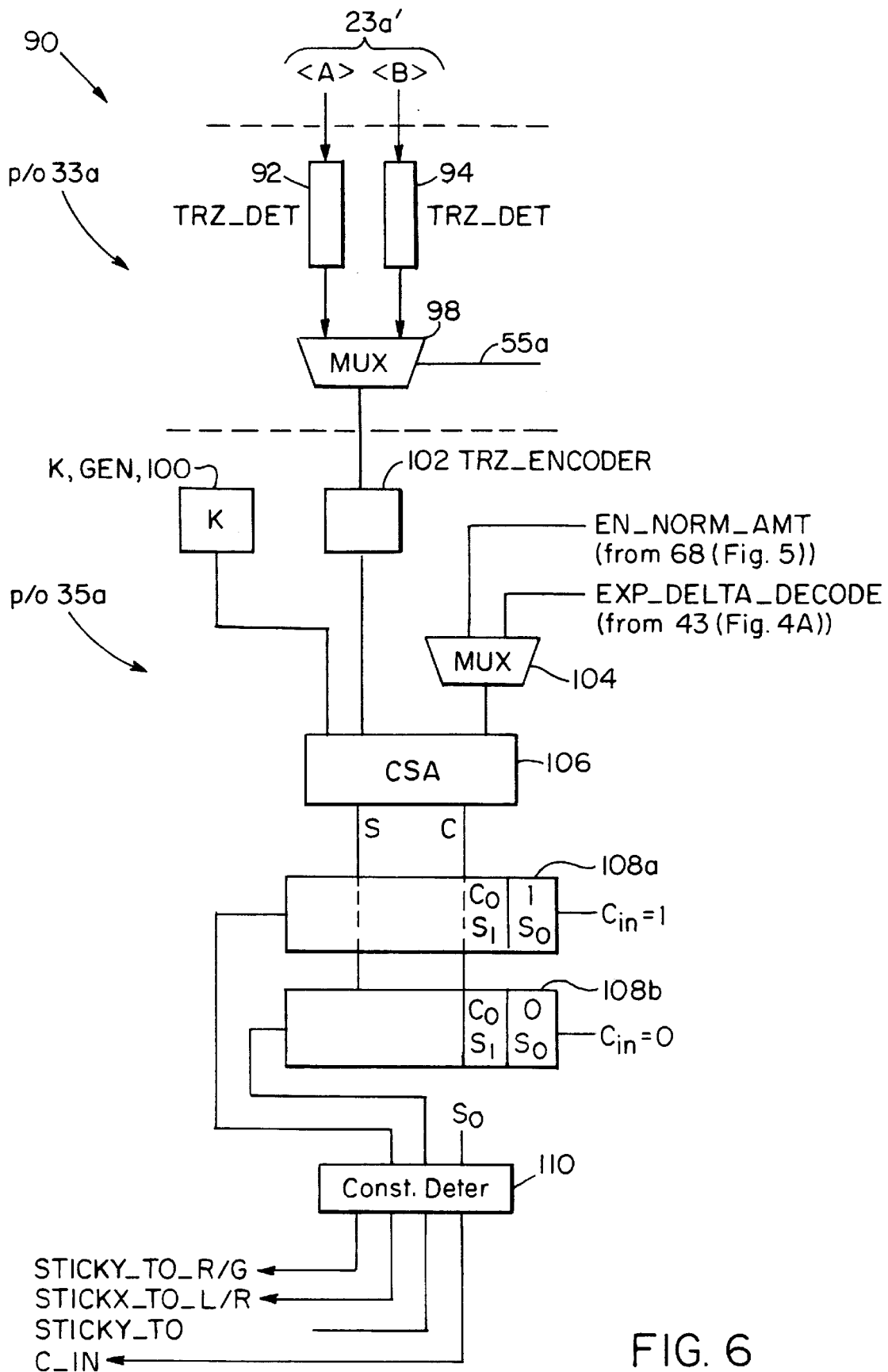
FIG. 6 is a block diagram of a sticky-bit prediction circuit used in the portion of add pipe of FIG. 4B.
Figure 7:
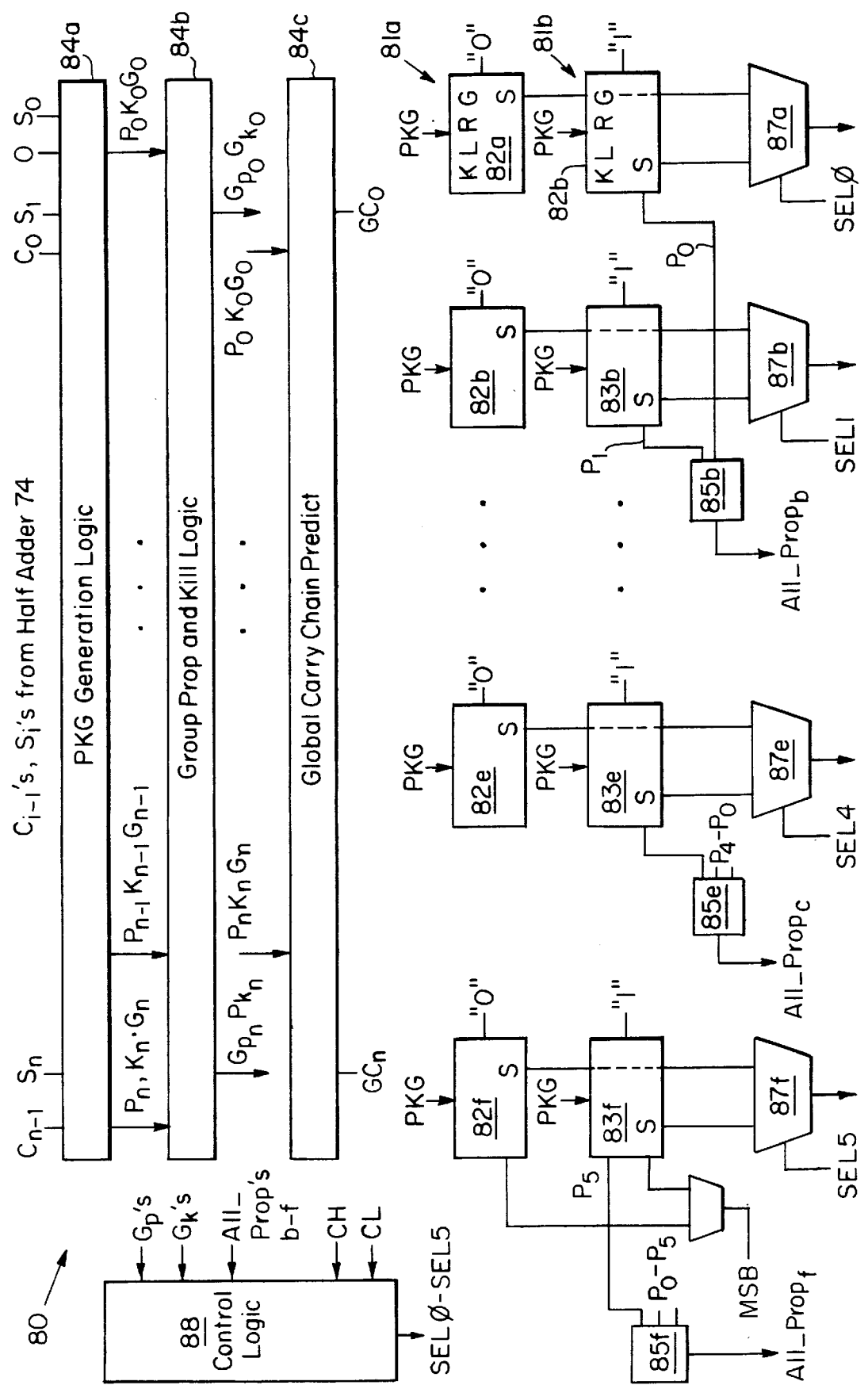
FIG. 7 is a block diagram of a rounding adder used in the portion of the add pipe of FIG. 4B.
Figure 8:
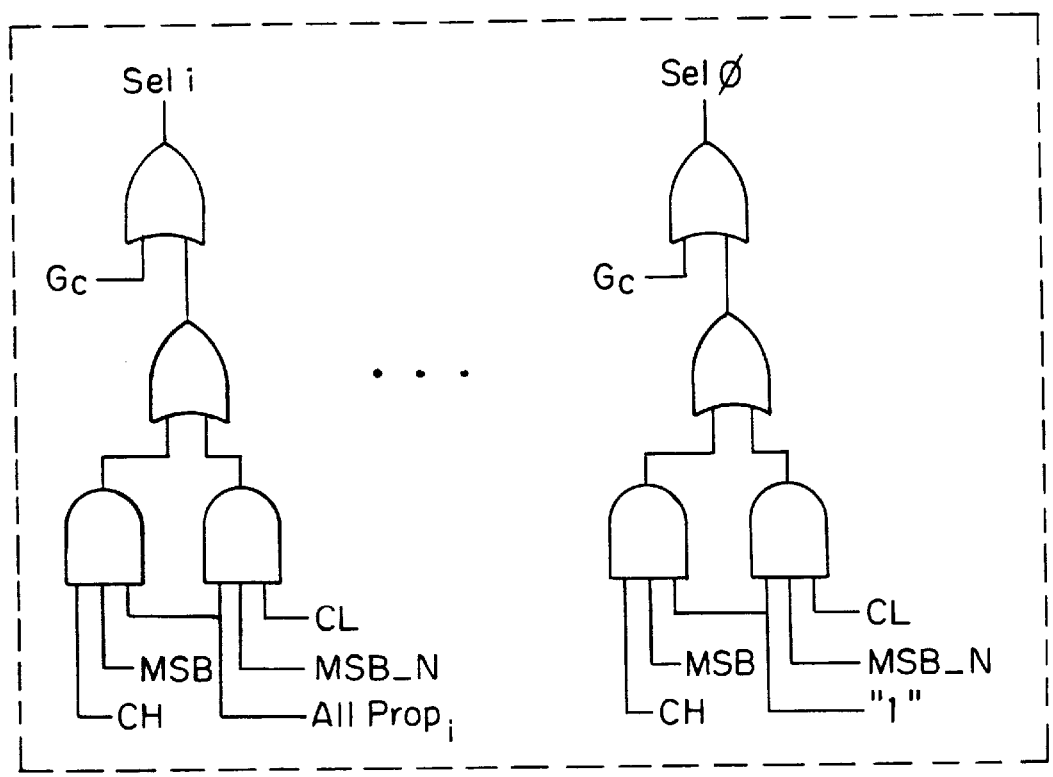
FIG. 8 is a block diagram of control logic used in the rounding adder of FIG. 7.

Round adder 80 as will be further described in conjunction with FIGS. 7 and 8, provides an add/subtract result of the input operands by using a series of carry select adder sections. The round adder 80 includes carry select logic which can determine which adder section to select based upon considerations of the rounding mode, detection of a sticky bit, propagation of a carry as a result of the addition operation and a global carry bit. The resulting sum or difference is rounded in accordance with the rounding mode of the floating point instruction. The rounding mode is provided via signals 91*a* provided from the output of a sticky bit prediction circuit 90 as will be further described in conjunction with FIG. 6.

Rounding adder 80 provides the rounded result in one cycle of pipe stage 27 using carry select adder sections and combinatorial logic to select correct rounded results for the LSB of the add or effective subtract operation. The combinatorial logic provides select enable signals for each of the carry adder sections, to select the proper sum for each section in accordance with the rounding mode and result of the addition operation. The resulting fractional part of the round adder is concatenated with the exponent result normalized or not normalized to provide the result which is stored in the register file 21 as mentioned above.

As for the exponent portion of the add pipe, a mux 71 is fed the Exp_Delta signal from 50 and some constants. The control for multiplexer 71 is provided from the control logic in accordance with the data type and mode to select the exp. difference or the constants. A gating circuit represented by the and gate 73 is fed the larger of the A and B exponents and an enable from the control logic. The outputs of the multiplexer 71 and the gating circuit 73 are fed to a double adder 77 to form EXP A+EXP B and EXP A+EXP B+1. These signals are fed to a multiplexing function in the rounding adder 80 and are selected as will be described. The multiplexing function 89 is at the same level in the add pipe as are multiplexers in a carry select adder portion of the round adder. The carry select adder portion is disposed in the fractional portion of the data path and the multiplexer function 89 selects which exponent is disposed in the data path for storage into the register file.

Normalization Shift-Predict

Referring now to FIG. 5, the normalization shift-predict circuit 50 is shown to include a predicted most significant result bit detector circuit 62 which produces three output vectors which are fed to a multiplexer 64. The output vectors provide a normalization shift prediction point corresponding to the most significant 1 in the vector. The vectors are provided for three different cases. The first case where the exponents are equal, EA=EB (A=B), the second where EA>EB (A–B/2), and the third where EA<EB (B–A/2). The multiplexer 64 selects one of those output vectors in accordance with a signal on line 44*a* provided from the exponent prediction difference circuit 44 (FIG. 4A). The selected one of the vectors from detector 62 is coupled to an excess one stripper 66 which is used to strip off or clear excess set or logic 1 bits which may be present in the vector provided from the output of the multiplexer 64 and to produce a vector at the output thereof corresponding to the normalization amount predicted in accordance with the inputs fed to the detector 62. The output is also fed to an encoder 68 to provide encoded amount which corresponds to the exponent difference predicted for the pair of input operands.

Circuit 50 thus provides a prediction of the normalization shift amount prior to obtaining the results of the predictive subtraction calculation on the input operands by examining the input operands and determining where the normalization shift point is for each of the potential cases of effective subtract with an exponent difference of 0 or 1. The three case being EXP_A=EXP_B, EXP_A=EXP_B+1, EXP_B= EXP_A+1.

As shown in FIG. 5A, the detector 62 includes three separate stages, each of which are fed via the fractional parts of input operands A and B. The first stage determines a normalization shift prediction point for the case where the exponent difference is equal to zero. The second stage determines the normalization shift prediction point for the case where the exponent difference EXP_A=EXP_B+1, (A−B/2) that is, A is greater than B, and the final stage determines the normalization shift prediction point for the case where EXP_B=EXP A+1, and thus, B is greater than A (B−A/2).

In the first stage 62a, each bit position is classified as either a triggered position (T), a borrow position (B) or a neutral position (N). A bit position is neutral if the minuend and subtrahend are equal. A trigger position signifies that the minuend bit is 1 and the subtrahend bit is 0, so that if the next more significant bit position is neutral and if the next less significant bit position is not a borrow, then the trigger bit position potentially indicates the shift point i.e. the most significant 1 of a positive result. A borrow position signifies that the minuend bit is a 0 and the subtrahend is a 1, and if the next less significant bit position is not also a borrow, a potential shift point is indicated. For EXP_A=EXP_B since the relative magnitudes of the fraction FRAC_A and FRAC_B are not known, it is also not known which operand is the minuend. Therefore, a simultaneous search for a shift point assuming FRAC_A>FRAC_B and FRAC_B>FRAC_A is required. The following definitions are provided for stage 62a for the searching for both FRAC_A>FRAC_B and FRAC_B>FRAC_A.

| Search FRAC_A > FRAC_B | | |
|---|---|---|
| Trigger | Borrow | Neutral |
| A<i>=1, B<i>=0 | A<i>=0, B<i>=1 | A<i> = B<i> |
| Search FRAC_B > FRAC_A | | |
| Trigger | Borrow | Neutral |
| A<i>=0, B<i>=1 | A<i>=1, B<i>=0 | A<i> = B<i> |

For an exponent difference of plus or minus one, since the smaller fraction is shifted right by one position the shift point can be determined more directly with a single search. The following definition are provided for stage 62b for EXP_A=EXP_B+1 and stage 62c for EXP_B=EXP_B+1 for determining T, B, N when the subtrahend is known and is shifted right by one bit position.

| Search EXP_A = EXP_B +1 | | |
|---|---|---|
| Trigger | Borrow | Neutral |
| A<i>=1, B<i+1> | A<i>=0, B<i+1>=1 | A<i> = B<i+1> |
| Search FRAC_B > FRAC_A | | |
| Trigger | Borrow | Neutral |
| A<i+1>=0, B<i>=1 | A<i+1>=1, B<i>=0 | A<i+1> = B<i> |

For example, in the search for the shift point for FRAC_A>FRAC_B, a trigger (T) position is defined as one where for the $i_{th}$ bit position of the fractional part of OP_A, the value of the position is equal to one, and for the corresponding bit position $i_{th}$ of the fractional part of OP_B, the value of the bit position is equal to zero, or (OP_A <i>=1, OP_B <i>=0). A borrow position is determined for the situation where the OP_A $i_{th}$ position is equal to a zero and the OP_B $i_{th}$ is equal to a one or (OP_A <i>=0, OP_B <i>=1). A neutral position is defined as a position where the $i_{th}$ bit of the A operand and the $i_{th}$ bit of the B operand are equal or (OP_A <i>=OP_B <i>).

Figure 5C:
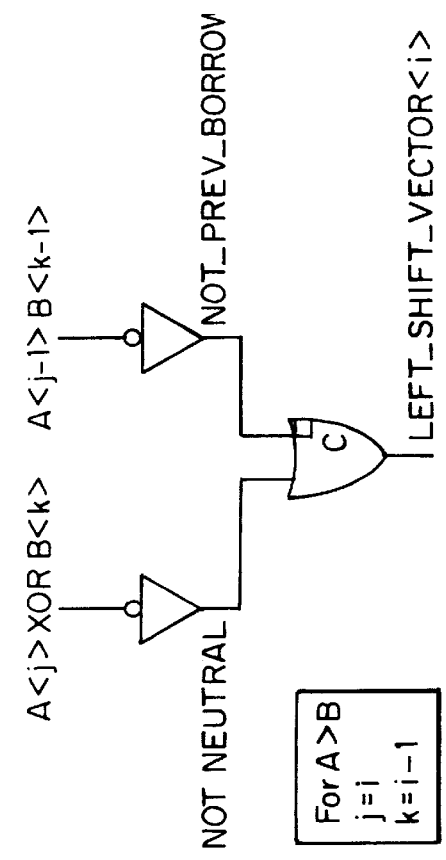
Figure 5D:
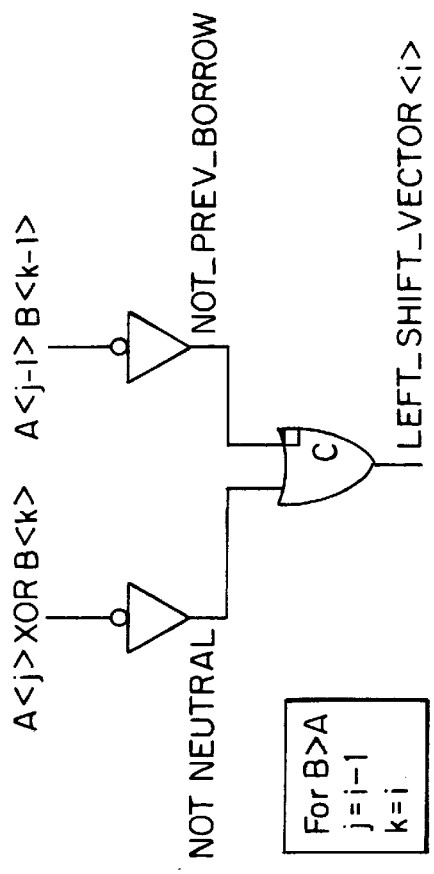
Figure 5B:
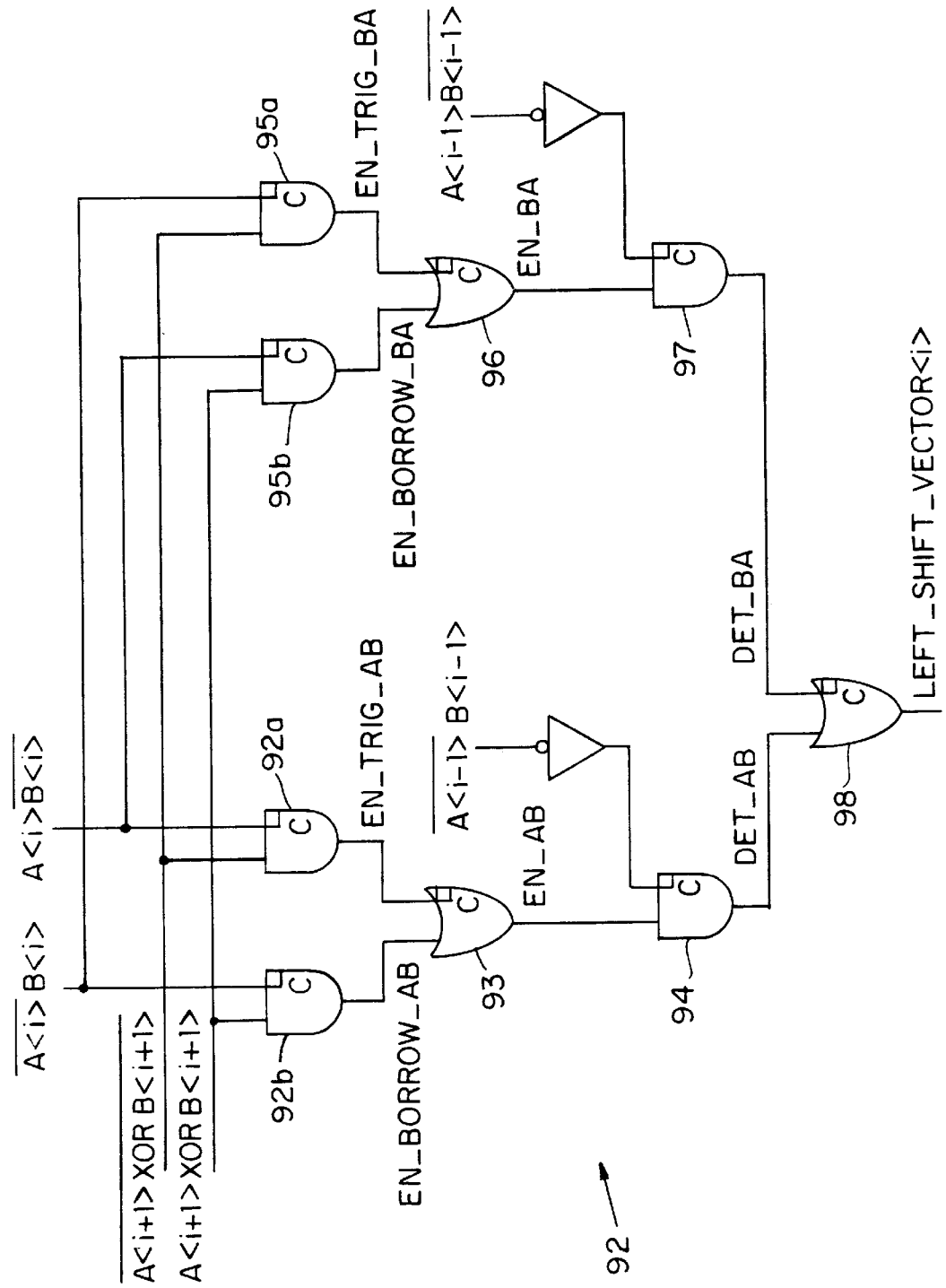

A generalized representation of a logic network used to implement each one of the stages 62a–62c of the normalization shift detector 62 is shown in FIGS. 5B through 5D.

Referring now to FIG. 5B, a combinatorial logic network 92 is shown for one bit position the $i_{th}$ position for the case where EXP A=EXP B. Each bit position would have a similar circuit. The network operates on each of the bit positions of the fractional parts of the input operands A and B to determine where a trigger (T), borrow (B) and neutral (N) positions exist and thus to determine a left shift vector which would have a "1" in the position of the number of places that the result should be shifted to provide the normalized result.

The logic circuit 92 which is a generalized representation of the logic network used on each of the bits of the input operands A and B is shown.

Gate 92a ANDs (A<i>&!B<i>) the trigger indication for FRAC_A >FRAC_B, with (A<i+1> xor B<i+1>) the neutral indication of a next more significant bit, and produces a signal EN_TRIG_AB, indicating bit i is a shift point if bit i−1 is not a borrow for FRAC_A >FRAC_B.

Gate 92b ANDS !(A<i>& B<i>) the borrow indication for FRAC_A >FRAC_B, with !(A<i+1> xor B<i+1>) the indication that a next more significant bit is a trigger or borrow itself, and produces the signal EN_BORROW_AB, indicating bit i is a shift point if bit i−1 is not a borrow for FRAC_A>FRAC_B.

Gate 93 ORs EN_TRIG_AB with EN_BORROW_AB, to produce EN_AB which indicate that bit i is a shift point if bit i−1 is not a borrow for FRAC_A>FRAC_B.

Gate 94 ANDs EN_AB with (!A<i>&!B<i>) the borrow indication from bit i−1 for FRAC_A>FRAC_B, to produce a signal DET_AB, indicating bit i is a shift point derived for FRAC_A>FRAC_B.

Similarly, gate 95a ANDS (!A<i>& B<i>) the trigger indication for FRAC_B>FRAC_A, with !(A<i+1> xor B<i+1>) the neutral indication of a next more significant bit, and produces a signal EN_TRIG_BA, indicating bit i is a shift point if bit i−1 is not a borrow for FRAC_B>FRAC_A.

Gate 95b ANDs (A<i>& !B<i>) the borrow indication for FRAC_B>FRAC_A, with !(A<i+1> xor B<i+1>) the indication that a next more significant bit is a trigger or borrow itself, and produces the signal EN_BORROW_BA, indicating bit i is a shift point if bit i−1 is not a borrow for FRAC_B>FRAC_A.

Gate 96 ORs EN_TRIG_BA with EN_BORROW_BA, to produce EN_BA which indicates bit i is a shift point if bit i−1 is not a borrow for FRAC_B>FRAC_A.

Gate 97 ANDs EN_AB with !(!A<i>& B<i>) the not borrow indication from bit i-i for FRAC_B>FRAC_A, to produce a signal DET_BA, indicating bit i is a shift point derived for FRAC_B>FRAC_A.

Gate 98 ORs DET_AB with DET_BA producing bit 1 of the LEFT_SHIFT vector for effective subtract with EXP_A=EXP_B.

An example using these rules is set forth below.

BIT      66665555555.h5444444444433...

```
Position       32109876543.h0987654321098...
                    -continued operand_A      00000000000.100001000000001xxx frac_B         00000000000.100000111111110xxx operand
shift_vector   00000000000.000000000000010xxx
```

In the above example, bit position 47 (i) is a trigger for the fractional part of operand A being greater than the fractional part of operand B. Bit position 48 (i+1) is neutral (N), but bit position 46 (i−1) is a borrow (B). Therefore, bit positions 46 through 40 which are borrows (B) for the fractional part of operand A being greater than the fractional part of operand B are rejected as shift points for the FRAC_A>FRAC_B tests. Bit positions 46 through 40 therefore do not qualify as a shift point for the fractional part of operand A being greater than the fractional part of operand B since each is a borrow with the next less significant bit position also a borrow (B) (i.e. a string of borrows (B). Bit positions 46 through 40 are rejected as triggers (T) for the fraction of operand B being greater than the fractional part of operand A, since positions 47 through 41 are not neutral (N), that is, they are not the start of a true trigger (T) point.

Bit position 39 (i) is a true borrow (B) for a fraction operand A greater than operand B, since bit position 40 (i+1) is not neutral (N) and bit position 39 (i) is followed by a non-borrow (B) in bit position 38 (i−1). Thus, bit position 39 is determined to be the correct left shift position point and a logic 1 is placed in the 39th bit position of the left shift vector. If the operands are reversed, the same shift point is determined since the result of the fractional subtract A greater than B or B greater than A is not required in determining the shift point.

The shift position as determined above is accurate to within one bit position, since a borrow (B) can occur following the shift point detection. The additional "1" position of left shifting to normalize the result is completed in the round adder 80 stage without a penalty in performance.

Referring to now to FIG. 5C, the logic for the case with the exponent A equals exponent B+1, that is, A is greater than B is shown. In essence, this logic which is implemented on a bit-by-bit basis operates on the input operands A and B using the $i_{th}$ bit position of the input operand A compared to the $i_{th}$+1 bit position of the input operand B. This likewise produces a left-shift vector having a 1 in a position which determines the shift point for that case. A similar arrangement is also provided for the case for the exponent, B, equal to the exponent A+1, that is, B being greater than A as shown in FIG. 5D.

Returning to FIG. 5, the left shift vectors for EA=EB, EA>EB and EA<EB are provided to multiplexer 64. The shift vector for EA=EB is selected for add-subtract instructions if a zero exponent difference is predicted by exponent predictor 44 (FIG. 4A). The shift vector for exponent A greater than exponent B is selected for add-subtract operations if the exponent predict indicates that A is greater than B and the instruction is not an add-subtract or convert and BN=1. The shift vector for exponent B>exponent A is selected if the exponent prediction is that B is greater than A.

The shift vector which is selected by multiplexer 64, may contain more than a single "1". The single "1" which is set in the most significant bit position indicates the required shift position, and all "1s" beyond that one are discarded.

The extra "1s" occur since the shift vectors are determined using information only of neighboring bit positions.

In the excess "1" stripper 66, the selected shift vector is scanned in a direction from the MSB to the LSB clearing all bits following the first detected bit set in the shift vector. The resulting output has one bit set which corresponds to the needed left shift control. Here bit 62 being set resulting in a shift of zero and bit zero being set resulting in a shift of 62. If bits 62 to 0 are all zero, a fractional zero flag is set and a left shift of 63 is enabled. A left shift of bit 63 results in a zero shifter output.

Thus, here the left shift vector is completely determined by the end of the phase in which the predictive subtract operation occurs and does not require the sign of the subtract result to determine the shift direction or shift amount. The NORM_AMT signal i.e. the stripped, shift vector is fed along lines 66a to multiplexer 55 (FIG. 4A). Thus, determining a normalization-shift amount at the same time as a single-phase fraction/subtract allows for a minimum latency implementation of floating point add-subtract operations.

The logic described in conjunction with FIGS. 5A through 5B can also be used in conversion of quad words to floating point words to determine a predicted shift vector to normalize a quad integer. For conversion from a quad word to a floating-point word format, input operand A is zero, therefore, the logic for determining the shift position for equal exponents with FRAC_B>FRAC_A does not detect that there is a borrow (B) in any bit position, and the fraction B is the quad data to be converted. If the integer is positive, then bit position 63 of operand b<63>=0. This conversion operation can be shown in the following example:

```
BIT            66665555555.h55444444444433...

Position       32109876543.h10987654321098...

operand_A      00000000000.000000000000000xxx frac_B         00001xxxxxx.xxxxxxxxxxxxxxxx operand
shift_vector   0001xxxxxx.xxxxxxxxxxxxxxxx
```

Bit position 60 sets as a FRAC_B>FRAC_A trigger (T) with bit position 61 being a neutral (N) position followed by a non-borrow (B) for bit position B>A. The first zero-to-one transition of fraction B is found.

For exponent A=exponent B+1 prediction, a shifted borrow (B) is determined for each bit position. For floating-point operands, a true shifted trigger (T) exists at the hidden bit position, thus a shift point is a first shifted borrow (B) not followed by a shifted borrow (B) in the next least significant bit position. The shifted borrow (B) at the hidden bit position is a <h>or b <h+1>which allows for the trigger (T) point for floating-point operands and for a shifted borrow (B) for quad-word conversions.

```
BIT            66665555555.h55444444444433...

Position       32109876543.h10987654321098...

operand_A      00000000000.100001000000001xxx frac_B         00000000000.11111xxxxxxxxxxx
```

```
                -continued
operand_A     00000000000.100001000000001xxx shift frac_B  00000000000.011111xxxxxxxxxxx shift_vector  00000000000.000010xxxxxxxxxxx actual result 00000000000.000010xxxxxxxxxxx
```

The predicted left-shift vector for exponent A−exponent B+1 can also be used to determine the left shift to normalize a quad integer which is negative for a convert quad to floating point representation. For the function convert quad to floating-point representation, fraction A is zero, therefore, a shifted borrow (B) is detected in any bit position of a shifted fraction B vector which is a one. If the integer is, in fact, negative, then the bit position 63 of operand B is equal to a one.

```
BIT           66665555555.h55444444444433...

Postion       32109876543.h10987654321098...

operand_A     00000000000.000000000000000xxx frac_B        1110xxxxxxx.xxxxxxxxxxxxxxxx operand_A     00000000000.000000000000000xxx shift frac_B  x1110xxxxxx.xxxxxxxxxxxxxxxx shift_vector  0001xxxxxxx.xxxxxxxxxxxxxxxx
```

Bit position 60 is a first shifted borrow (B) followed by a non-shifted borrow (B) of bit position 59. The first one to zero transition of fraction B is thus found. For the exponent B equal exponent A+1 prediction, a shifted borrow (B) is determined for each bit position. For floating point operands, a true shifted trigger (T) exists at the hidden bit position, and thus, the shift point is the first shifted borrow (B) not followed by a shifted borrow (B) in the next least significant bit position.

```
BIT           66665555555.h55444444444433...

Postion       32109876543.h10987654321098...

operand_A     00000000000.10xxxxxxxxxxxxxxx operand_B     00000000000.10xxxxxxxxxxxxxxx operand_B     00000000000.10xxxxxxxxxxxxxxx
shift
operand_A     00000000000.01xxxxxxxxxxxxxxx shift_vector  00000000000.10xxxxxxxxxxxxxxx actual result 00000000000.10xxxxxxxxxxxxxxx
```

The B>A detect vector is not used for conversion from quad to floating point.

Sticky Bit

Referring now to FIG. 6, a circuit to determine in response to the input operands, A and B, a floating point sticky bit in the add pipe is shown to include a pair of trailing zero detect circuits 92 and 94, fed by the fractional parts of input operands A and B. The trailing zero detect circuits, 92 and 94, respectively scan each of the fractional parts of the input operands from the LSB position to the MSB position and produce a trailing one vector for each operand which retains the first bit set from the LSB position and removes all ones which are more significant from subsequent bit positions. The trailing one vector from each of the operands is fed to a multiplexer 98. The multiplexer 98 selects one of the trailing zero operand outputs TRO_A or TRO_B in accordance with the operation to be performed on the input operands and the relative size of the exponent of each of the input operands.

Here, vector TRO_A is selected if the instruction, being processed in the floating point processor, is a floating point add or a floating point subtract and the exponent of operand B is larger than the exponent of operand A. For all other cases, TRO_B is selected. The signal which controls multiplexer 98 is provided from the exponent difference control 45 (FIG. 5) which is determined from the sign of the exponent difference. The selected trailing zero vector is provided to an encoder 102 which encodes a value corresponding to the position of the trailing one in the vector equal to the normalization shift amount. This value is fed as one of the inputs to a carry save adder 106. In addition a second input to the carry save adder 106, is a constant "K" which is generated by a circuit 100 as will be further described. The third input to the carry save adder 106 is provided via multiplexer 104 which selects between the exponent difference provided from exponent difference prediction circuit 43 (FIG. 4A) via line 43a and an encoded normalized shift provided from circuit 68 (FIG. 5).

Mux 104 selects the exponent difference for floating point adds and subtracts and selects the encoded normalized shift amount for conversions from floating point to quad word operations.

The carry-save adder 106 reduces the three values just described (i.e. the exponent difference or encoded shift value, the encoded trailing zero value and a selectable constant) into a sum and a carry vector. The sum and carry vectors are input to two carry chain circuits, 108a and 108b such that each bit i of the sum vector is input to bit i of 108a and 108b, and each bit i of the carry vector is input to bit i+1 of 108a and 108b. For carry chain 108a the input for the carry vector at bit position i=0 is set to one and a carry-in to bit 0 is also set to 1. For carry chain 108b the input for the carry vector at bit position i=0 is set to zero and a carry-in to bit 0 is also set to a zero. The carry outputs from carry chains 108a and 108b and input sum bit S0 are fed to circuit 110 which is used to determine C_IN the carry input to the round adder 80 and signals STICKY_TO_R/G, STICKY_TO_L/R, STICKY_AT_L/R. The sticky bit signals are also used in the circuit 110 to modify the RND_MODE control signals which are used in the rounding adder 80.

The sticky bit STICKY_TO_R/G, STICKY_TO_L/R and STICKY_AT_L/R are determined in the carry-save-adder 106 by selecting the three input values of the ETRO or the number of trailing zeros in the operand which is being shifted, −EDIFF, the shift amount, and a constant which biases the ETRO−EDIFF comparison with respect to the operation and precision (−29 for single precision) of the operand that is being shifted. The actual inputs to the carry save adder 106 are selected as follows:

For SUBG or SUBT, the CSA inputs are ETRO, −EDIFF, and 0.

For SUBF or SUBS, the CSA inputs are ETRO, −EDIFF, and −29.

For ADDG or ADDT, the CSA inputs are ETRO, −EDIFF, and −1.

For ADDG or ADDT, the CSA inputs are ETRO, −EDIFF, and −30.

For CVTQG or CVTQT, the CSA inputs are ETRO, −EDIFF, and −2.

For CVTQF or CVTQS, the CSA inputs are ETRO, −EDIFF, and −31.

The sum and carry outputs of the carry-save adder are input to the front end of two static adders (i.e. the carry chain without the output XORs required to determine the result). The carry output of the adders determines the sign of the result. The carry chain 108b determines the sign of the carry-save adder sum and the carry save adder carry, ETRO (exponent trailing zero)−EDIFF+constant+2) by setting the unused LSB input and the carry input both to one. This technique of biased constants and parallel carry chains eliminates the need for determining the result of a single compare and further decodes of the comparison subtract result to STICKY_TO_L/R, STICKY_TO_R/G and STICKY_AT_L/R, thus speeding up the determination of the sticky bit information. The output of the carry chains i.e. the last carry bit CN and the first sum input from bit 0 of the carry save adder 106 are inputs to a sticky bit logic 110. Sticky bit logic 110 is used to provide signal C_IN for use by the round adder FIG. 7 and signals STICKY_TO_R/G and STICKY_TO_L/R and STICKY_AT_L/R, as explained above.

The sticky bit signals STICKY_TO_R/G and STICKY_TO_L/R and STICKY_AT_L/R are used in the setup for the round adder carry input and to modify the bit position where the round bits are injected into the carry adder. The carry and round flow signals are valid at the start of cycle 7, one cycle after ETRO is valid at the end of phase 6A. The sticky bit signal is used to determine an exact result and to determine results which are exactly halfway between representable values thus requiring the LSB to be zero if the rounding mode is rounded to nearest even.

The round adder C_IN signal is set for effective subtracts where the exponent difference is greater than one for when there is a carry out of carry chain 108a and the result is not sticky to the guard bit. That is, when the signal STICKY_TO_R/G for subtract operations is equal to zero. Since the shifted operand is not sticky to the guard bit G all of the bits shifted beyond the G bit are zero and the complement of these bits are all ones. The carry in for infinite precision subtract will carry over the ones to the right of the guard bit and into the guard bit position when the shifted operand is not sticky to the guard bit, since all the ones complement bits of the shifted operands are ones. If STICKY_TO_R/G is asserted, a one is shifted beyond the guard bit so that a zero exists in the ones complement representation of the bits of the shifted operand which are less significant than the guard bit, so that C_IN=0 is inserted into the G-bit position for the infinite precision result. The signals C_IN are also set for subtractions with the exponent difference equal to zero which is negative in order to accomplish a two's complementing of the predicted subtraction result from add pipe stage 23. Signals C_IN to the round adder are inserted into the G bit position as determined for single and double precision.

The STICKY_TO L/R for subtraction calculation is used to select the rounding flow for infinity mode rounding. The subtract infinity round flow (where a round bit is added at the R bit position if the fraction result prior to rounding is less than ½, and a round bit is added to the L bit position if the fraction result prior to rounding is ½ or greater) is selected if the STICKY_TO_L/R signal is set indicating that the result is known to be inexact independent of the fraction magnitude.

The flow for normal subtraction rounding (where the round is added at the G bit position if the result prior to rounding is less than ½ and a round bit is added to the R bit position if the fraction result prior to rounding is ½ or greater) is selected if the result is not sticky to R.

If the result is not sticky to the G bit (STICKY_TO_R/G=0), and the G bit in the data path is a zero, then rounding at the G bit position does not the result for a pre-rounded fraction less than ½. When the G bit is a one and the result is not sticky to the G bit (STICKY_TO_R/G=0), for a pre-rounded fraction less than ½, the result is not exact but actually ½ of an LSB and rounding at the G bit position increments the result.

If the result is not sticky to the R bit (STICKY_TO_L/R=0), and the R bit in the data path is a zero, then rounding at the R bit position does not the result for a pre-rounded fraction greater than or equal to ½. When the R bit is a one and the result is not sticky to the R bit (STICKY_TO_L/R=0), for a pre-rounded fraction greater than or equal to ½, the result is not exact but actually ½ of an LSB and rounding at the R bit position increments the result.

The Add infinity round flow, (where the round bit is added at the L bit for L greater than result and at the K bit position for result greater than or equal to 1) is selected if the result is STICKY_TO_L/R and thus known to be inexact independent of the fraction magnitude.

The flow for normal add rounding (where is the round bit is added at the R bit position if the fraction result prior to rounding is less than 1 and to the L bit position if the fraction result prior to rounding is 1 or greater) is selected if STICKY_TO_L/R is not set.

If the result is not sticky to the R bit (STICKY_TO_R/G=0), and the R bit in the data path is a zero, then rounding at the R bit position does not affect the result for a pre-rounded fraction greater than ½. When the R bit is a one and the result is not sticky to the R bit (STICKY_TO_R/G=0), for a pre-rounded fraction less than 1, the result is not exact but actually ½ of an LSB and rounding at the R bit position increments the result.

If the result is not sticky to the L bit (STICKY_TO_L/R=0), and the L bit in the data path is a zero, then rounding at the L bit position does not the result for a pre-rounded fraction greater than or equal to 1. When the L bit is a one and the result is not sticky to the L bit (STICKY_TO_L/R=0), for a pre-rounded fraction greater than or equal to 1, the result is not exact but actually ½ of an LSB and rounding at the R bit position increments the result.

For CVTQf of positive results with infinity rounding the infinity round flow (rounding at the L bit ) is selected if the result is sticky to L which indicates that the result is inexact. For CVTQf of negative results with chop rounding, the infinity round flow (rounding at the L bit) is selected if the result is sticky to L which means the result is inexact and the next lower negative integer is the rounded result.

When a result of a conversion from floating point to quadword integer is too large to be represented by the 64 bits of the integer format, the destination register receives the lower 64 bits of the full result. Should the floating point number be large enough that bits 62:0 of the result are all zeros, the zero bit "Z-bit" needs to be set in the destination register. If the fraction part of the floating point number being converted to a quadword integer needs to be shifted left by more than 63 bit positions (i.e. exponent exceeds the bias plus 52 by at least 63), the resulting low order 63 bits returned are zeros and the Z-bit is set. When, however, the floating point fraction requires a left shift of less than 63 positions (bias+52 <exponent<63), it needs to be determined whether or not all ones in the fraction will be left shifted beyond bit 62 of the resulting quadword integer.

The sticky bit detect logic is not needed to determine the sticky bit when the fraction is left shifted since there is no sticky bit. So the sticky carry chain is available for another comparison. The comparison determines whether the LSB of the floating point fraction is being left shifted beyond bit 62 of the resulting quadword integer. The trailing zero detect and encoder produces a value which indicates the bit position of the low order one in the floating point fraction. The sticky bit CSA inputs are a constant of "−63", the left shift count (result of [bias+52] minus the operand exponent), and the trailing zero encode of the fraction. This feature eliminates a critical path in determining the Z-bit in time for a write to the destination register. It also eliminates the datapath height required for a separate zero detect by utilizing existing normalization shift, trailing zero, and sticky bit hardware to calculate the Z-bit.

Rounding Adder

Referring now to FIG. 7, the rounding adder 80 in stage 3 of the add pipe 27 is shown to include a first set of carry-select adder sections 81*a*, comprised of carry-select adder groups 82*a*–82*f* and a second set of carry-select adder sections b comprised of carry-select groups 83*a*–83*f* as shown. The rounding adder further includes PKG generation logic 84*a* which on a bit by bit basis examines whether A and B operands (here the $S_i$ and $C_{i-1}$ bits from the half adder 74) will generate, propagate or kill a carry. The PKG signals $P_i$, $K_i$, and $G_i$ for each bit position are fed to Group propagation and kill logic 84*b*. The group propagate logic 84*b* determine whether each adder group 82*a*–82*f* will kill or propagate a carry from the group and provides signals $G_i$ and $G_{Ki}$ for each group. The adder further includes a global carry chain logic circuit 84*c* which in response to signals $P_i$, $K_i$, and $G_i$ and signals $G_{Pi}$ and $G_{Ki}$ generate global carries i.e. look ahead carries for each group without regard to rounding. The global carries $G_{Ci}$ for each group are fed to control logic 88. The round adder further includes an ALL_PROP generation logic 85*b* to 85*f* which determines whether the internal propagation logic signals of the current adder group and all preceding groups propagate a carry, producing signals ALL_PROP$_0$ to ALL_PROP$_6$.

Here each of the group adders 82*b*–82*f* and 83*b*–83*f* are typically eight-bit adders (adders 82*a* and 82*b* are four bit adders which operate on the KLRG bit positions) which are fed by the PKG signals on a bit by bit basis. The carry and sum outputs from the half adder 74 are fed to the inputs of the round adder with the $i^{th}$ sum bit position of the half adder and the $i^{th-1}$ carry bit position providing inputs for the $i^{th}$ bit position of the rounding adder. The outputs of each of the carry-select adder sections 82*a*–82*f* are coupled to one input of a corresponding bank of multiplexers 87*a* to 87*f* with the outputs of the second set b of carry-select adders 83*a*–83*f* coupled to a remaining input of the corresponding bank of multiplexers 86 as shown.

The first adder 82*a* and 83*a* in each of the set of adders 81*a* and *b* operate on the KLRG bit positions of the operands for double precision floating point numbers. A similar set of adders (not shown) for each set of adders are provided for single precision floating point numbers at the appropriate bit positions.

The first set of carry-select adder sections 81*a* produce an add result which corresponds to corresponds to a zero carry-in to each carry-select adder, whereas the second set b is used to provide a result which corresponds to a one at the carry-in of each carry-group adder 83*a*. That is, carry-select adder sections 81*a* provide a result without a carry input for the sections, and carry-select adder sections b provide a result with a carry input.

The determination of which of the carry-select adder sections in each of the sets, 81*a*, 81*b* of carry-select adder groups is selected to provide bits to the output of the rounding adder 80 is determined in accordance with a control circuit 88. For sections A–F the carry select adder from set 81*b* is selected if there is a global carry into that section when adding the input operands from the half adder, or if by adding a 1 in the appropriate bit position (K, L, R. and G) a carry from rounding will be propagated to that section. The carry to a section which results from rounding is determined in circuit 88 by signals, CL, CH, MSB, MSB_N, and ALL_PROP.

For effective subtraction, the fraction result from round adder 80 is either between ¼ and ½ or between ½ and 1. For effective addition the fraction result from the round adder 80 is between ½ and 1 or 1 and 2. Signal MSB_N is asserted when a fraction result falls within the lower bound and signal MSB is asserted when a fraction result falls within the upper bound. The position to insert the rounding bit is not known when the round add is started. The proper bit position to round can be either of two possibilities. For fraction results in the lower range the round bit is inserted at a 1 bit less significant bit position than results in the upper range. Two carry outputs of the K bit position are determined by round adder 80, CL inserting the round for the lower range and CH inserting the round for the upper range of the fraction result. If each bit position more significant that the K bit to the input bit of a section is a propagate, and there is a carry due to rounding at the K bit position ((CL & MSB_N) or (CH & MSB)), a carry into that section due to rounding is determined.

The control circuit has as inputs signals ALL_PROP$_0$ to ALL_PROP$_5$ which are determined from the propagate signals internal to the adders by logic circuits 85*b* to 85*f*. PKG logic 84*a* is disposed between the rounding adder and the half adder, and is fed by the half adder sum ($S_i$) and carry ($C_{i-1}$) signals on a bit by bit basis. The PKG logic 84*a* determines whether at each bit position a kill carry, a propagate carry or a generate carry is provided. That is the PKG logic determines carries at the bit or local level providing signals $P_i$, $K_i$ and $G_i$. These signals are fed to a group detection logic 84*b* which produces signals $G_P$ and $K_P$ which determine whether the adder groups 82*a* to 82*f* and 83*a* to 83*f* will kill or propagate a carry from the group. These signals which are fed to the control logic 88 are used to generate the output signals from the control logic 88.

Suffice it here to say that the control circuit 88 provides select-enable signals to each of the multiplexers 87*a*–87*g* to select at the output thereof either results provided from selected ones of the carry-select adder sections in set 81*a* or selected ones of carry-select adder sections in set b.

The rounding adder 80 thus uses the properties of a carry-select adder with a single section select to perform a combined result/rounding addition in the single phase of the add-pipe cycle. The least significant four bits of the addition are designated as "K bit" which is one bit more significant than the least significant bit of the fraction, the L bit, which is the least significant bit of the fraction, the R bit or the round bit which is one bit less significant than the L bit and the G bit or guard bit which is one bit less significant than the R bit. Rounding occurs in these positions by selective injection of a bit in one of the positions in accordance with the rounding mode and the values of signals fed to the control logic. This addition is determined for either single precision or double precision operations using the half adder disposed in the single precision or double precision positions.

Rounding is accomplished in one of four different modes: SNML (subtract normal); ANML (add normal/subtract), AINF (add infinity), or chop. The positions and values where a round bit is added are shown below in TABLE 1 for each of the modes.

TABLE 1

| Round Mode Flow | K | L | R | G |
|---|---|---|---|---|
| SNML low | | | | +1 |
| SNML high | | | +1 | |
| ANML low | | | +1 | |
| ANML high | | +1 | | |
| AINF low | | +1 | | |
| AINF high | +1 | | | |
| CHOP low | | | +0 | |
| CHOP high | | | +0 | |

The selection of the round mode flow used is determined from the instruction type, the rounding mode specified for the instruction, the sign of the result and the results of the sticky bit logic detection. For the SNML mode, the value of bits K L R and G and the carry out at the K-bit position rounded at the G bit and the value of K L R and G and carry out rounded at the R bit are determined.

The SNML mode is used for effective subtract with VAX® (Digital Equipment Corp.) rounding or IEEE RNE (round to nearest even) rounding. For normal rounding effective subtracts, the guard bit G portion represents the actual round bit if the result is less than one-half which requires a left shift to normalize, and the R bit position is the actual round bit if the result is between one-half and one where no normalization shift is necessary.

The SNML flow is also used for effective subtraction IEEE INF rounding, if the infinite precision result before rounding is exact to the R bit and is not sticky_to_R. In that instance, the R bit position is the actual L bit for the effective subtract where the result is less than one-half. Rounding at the G bit does not change the result since the G bit of the result prior to rounding is known to be zero (since it is not sticky to the R bit). For effective subtract, therefore, if the result is between one-half and one, the L bit is the actual L bit of the result. Rounding at the R bit portion for effective subtraction and not sticky to the R bit results in no change to the result if the R bit is zero (exact to L) and adding a one to the result if the R bit itself is set (not exact).

The ANML flow is used for: an add-type instruction with VAX® rounding or IEEE RNE rounding (round to nearest even); for effective subtracts with infinity rounding if the result is sticky_to_G, for effective adds with infinity rounding if the result is not sticky to R; and for CVTFQ VAX rounding or IEEE RNE rounding of positive numbers and chopping (adding toward zero) of negative quad integers.

For add_type instructions with normal rounding, the R bit position represents the actual round bit if the result is less than one (that is, it requires no shift to normalize) and the L bit position is the actual round bit if the result is between 1 and 2 (where a right normalization shift is necessary).

ANML mode is also used for add-type IEEE infinity rounding if the result is not sticky_to_L. The L bit position is the actual least significant bit for the add-type rounding when the result is less than one. Therefore, rounding at the R bit does not change the result since the R bit of the result prior to rounding is known to be zero, that is, the result is not sticky to L. For add-type of instructions, if the result is between one and two, the K bit is the actual L bit of the result. Rounding at the L bit position for add-type of instructions and not sticky to L results in no change to the result if the L bit is zero, that is, the result is exact to L, and adding one to the result if the L bit itself is set.

For effective subtraction, the R bit is the actual LSB for results less than one-half, and the L bit is the actual LSB for results greater than one-half. Thus, for infinity rounding, if the result is sticky to R and known to be inexact, the ANML flow is selected. For CVTQF the result does not require normalization and the ANML round flow is used for infinity rounding at the R bit position.

The AINF flow is used for infinity rounding of add-type instructions and for convert floating point to quad word (CVTFQ). For add-type of instructions, the L bit is the actual L bit for results less than one and the K bit is the actual L bit for results greater than one. Thus, for infinity rounding if the result is sticky to L and known to be inexact, the ANML flow is selected. For CVTFQ the result does not require normalization and AINF rounding is used for infinity rounding at the L bit position and to chop negative quad integers which are sticky to L and are, therefore, not exact.

The chop flow is the default flow when the final result is not to be incremented at the G, R, L or K bit positions. Control lines specifying the flow are asserted at the start of the round add. The control lines and the signals on the control lines are determined from instruction type during decoding of the floating-point instruction, sign of the result, and the result of the sticky bit calculations.

Referring now also to FIG. 8 the control logic to provide the select signals for the multiplexers 87a to 87f is shown. The control logic 88 is responsive to the signals from the group detection propagation logic 84b which determines group or section propagates as well as group or section kills.

The control logic further includes a global carry chain logic 84c (FIG. 7) which is used to determine carries from the group propagation and group kill logic. In addition the control logic includes combinatorial logic which is responsive to the MSB of the result, carry signals from the KLRG adder, and ALL_PROP signals from the propagation logic.

As shown in particular in FIG. 8, the control logic implements the following logic equation ($G_C$+(($C_H$ ●MSB) +($C_L$ ●MSB_N) for the first stage and for subsequent stages ($G_C$ +((CH ●MSB ●ALL_PROP)+($C_L$ ●MSB_N ●ALL_ PROP). In a preferred embodiment push-pull cascode logic is used to implement the multiplexer function 87a, 87f in response to the logic equivalent of the above signals. This type of logic can be used elsewhere in the circuits if desired.

Thus $C_L$ and $C_H$ for the K, L, R, G bits are determined as well as the result K, L, and R bits for low rounding and K and L bits for high rounding. Since the K, L, R, G sum, prior to addition of a round bit, is formed from the outputs of the half adder, 74, the maximum sum possible is 1 0110 (22) in base 10. The sum of K,L,R, G plus a round at the K bit position is 1 1110 (30) which is less than 32 so only one carry out of the K, L, R, G section occurs from the addition of the input, sum, carry and round values. In general, the half adder is needed for implementation of the IEEE rounding modes. The adder is used to propagate a carry out of the KLRG positions which can occur with the IEEE modes. With other modes it may not occur and thus the half adder can be eliminated. Alternatively, the carry chain logic could be more complex to handle the additional carry and thus eliminate the need for the half adder.

The MSB of the result is determined without the effects of rounding. If the result prior to rounding is less than one-half for effective subtraction, or less than one for add-type of instructions, then the K, L, and R_low value and low carry out of a K bit position are selected to complete the rounding operation; otherwise, the K and L high values are chosen. CL and CH are determined with look-ahead logic which is separate from the K, L, R, G additions. If all propagates exists between the K bit and the bit position that the round bit is added, that carry out signal is asserted. CL and CH are thus "don't cares" when there is a carry out in the K bit position prior to rounding as the group following the K bit already selects the high result without rounding. Thus CL and CH assert when there are all NON-KILLS (that is either propagates or generates) from the K bit to the bit position where the round bit is being inserted.

If there is a carry out from the K, L, R, G section of the round adder as the result of adding just the input sum and carry bits, then the bits beyond the K, L, R, G section are not modified further due to rounding since the global carry signal will already be asserted if each bit position more significant than the K bit till the input bit of a section is a propagate. Each carry-select section, therefore, simply follows the carry in for that section without rounding included.

However, if there is no carry out of K, L, R, G section of the round adder as a result of adding just the input sum and carry bits and the CL=1 & MSB_N or CH equals 1 and MSB then the carry out of the K bit position (COUT <K>) for the selected K, L, R, G rounding mode is a 1 and further adjustment of the final rounded result is required. The first carry-select section 82a, just beyond the K bit, is switched to select its sum assuming the carry input is to be asserted. The next carry-select section 82b is switched to the sum assuming a carry, when COUT<K> is asserted as a result of rounding and every bit of section 82a is a propagate. Section 82c is switched to select the sum for a carry input if COUT<K>is asserted as a result of rounding and every bit of section 82a and section 82b are propagates. That is, each section switches to the sum assuming a carry input when the group propagates for all less significant sections to the K bit are asserted and there is a carry out of a K bit as a result of rounding.

inserted into quotient register 120 as will be described and shifted through the register in accordance with the cycle of the division operation performed in divider 38.

The quotient register 120 is here shown comprised of a pair of sections a lower section 124 here comprised of storage locations for bit numbers B0 to B26 and upper section 126 comprised of storage locations for bit numbers B27 to B53. The lower section 124 is generally used for single-precision floating point operations whereas the upper section 126 is used with lower section 124 for double-precision operations. The output from control logic 120 is coupled to a multiplexer 122 or an input of upper section 126, and in accordance with the mode of operation determined by mode signal FS, the multiplexer will either select as the input the output from the control logic 120 or the output from the last position, here $B_{27}$, of the quotient register portion 126.

The quotient register 120 is shown to further include an overflow section 127 here having three bit positions, $A_0$–$A_2$ as shown. The output from the quotient register, that is bit positions $B_{50}$ to $B_0$ and $A_0$ to $A_2$ is fed to the add pipe stage 27 to the rounding adder 80 (FIG. 7) for rounding operations in accordance with the particular rounding mode selected by the division instruction executed in the divider 38. Bit position $B_{53}$ to $B_{51}$ are ignored.

The divider 38 operates as follows: The quotient register 110 is initialized to provide all bits at zero state. A fractional part of the divisor is loaded into register 110. The fractional part can either be single precision or double precision. The divisor is fed through selecting logic 112 which after the first pass will change the sign of the divisor to subtract the divisor from a dividend. The dividend is typically stored in register 116, the remainder register, and is present at the input to the adder 114 when the divisor is provided at another one of the inputs. A initial partial remainder is thus determined by subtracting the divisor from the dividend and the results are

|  |  |  |  |  |  | KRLG |  |
|---|---|---|---|---|---|---|---|
| OP_A | 0.0010101 | 10010101 | 01010101 | 01010101 | 01010101 | 01010101 | 0101 |
| OP_B | 0.0101010 | 10101010 | 10101010 | 00101010 | 10101010 | 10101010 | 1010 |
| group $C_{in}$ |  | 1 | 0 | 0 | 0 | 0 | 0 |
| group Prop |  | 0 | 1 | 0 | 1 | 1 |  |
| adder sections FIG. 7 | 82f | 82e | 82d | 82c | 82b | 82a |  |
| sections w/o cy | 0.0111111 | 00111111 | 11111111 | 01111111 | 11111111 | 11111111 |  |
| adder sections FIG. 7 | 83f | 83e | 83d | 83c | 83b | 83a |  |
| sections w/ cy | 0.1000000 | 01000000 | 00000000 | 10000000 | 00000000 | 00000000 | 0000 |
| results w/o rnd | 0.1000000 | 00111111 | 11111111 | 01111111 | 11111111 | 11111111 | 1111 |
| results rounding | 0.1000000 | 00111111 | 11111111 | 10000000 | 00000000 | 00000000 | 0000 |

Quotient Register

Figure 9:
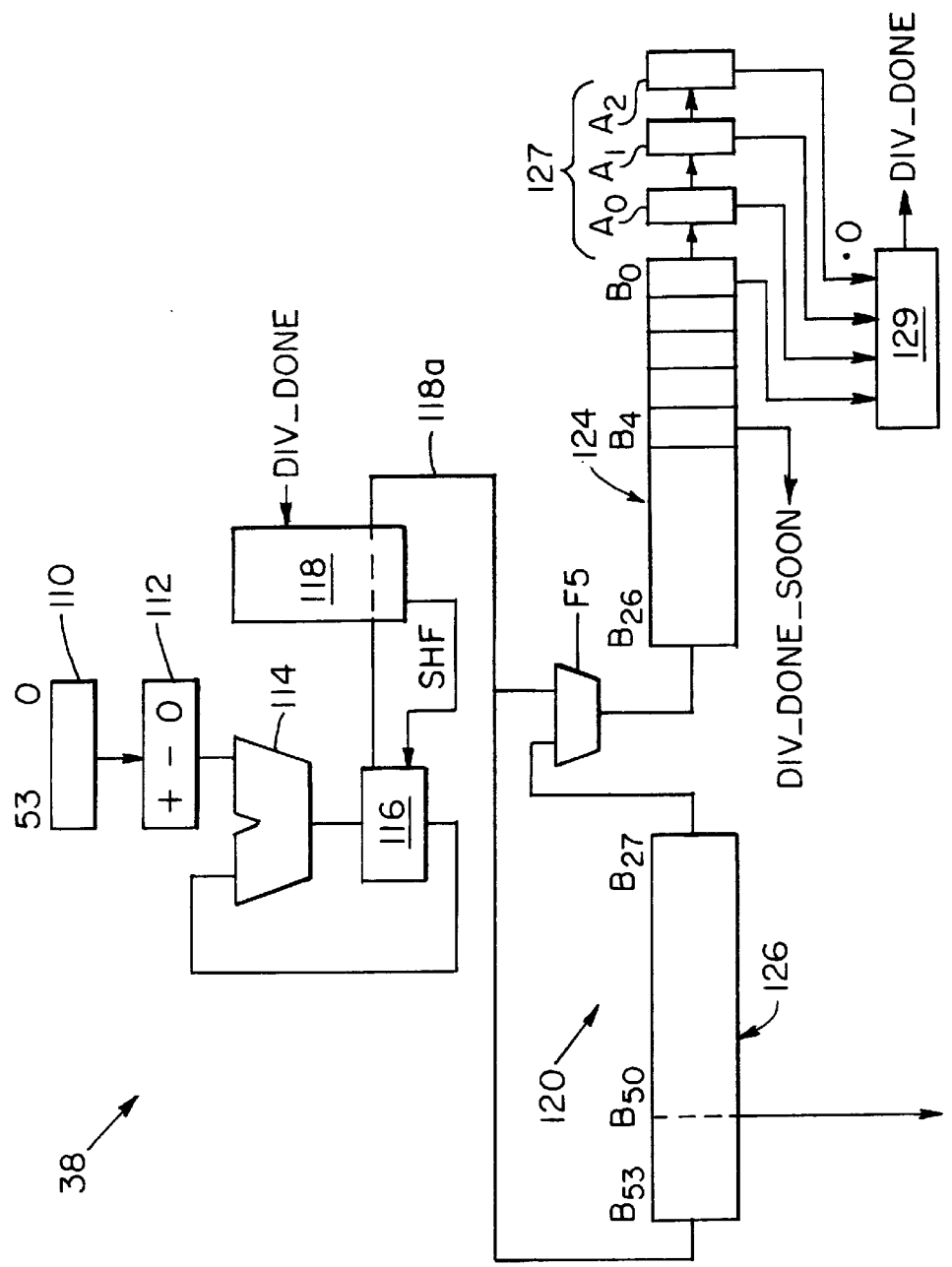
FIG. 9 is a block diagram of a portion of a divider including a quotient register used in the add pipe of FIG. 2.

Referring now to FIG. 9, a portion of the divider 38 (FIG. 2) is shown to include a register 110 which holds a fractional portion of a divisor and a selection block 112 which either adds the divisor, subtracts the divisor or inserts a zero instead of the divisor during each division cycle of the divider 38, as will be described. The results of formatting block 112 are fed to an adder 114, here adder circuit 114 being a fast adder. The output of the adder is fed to a remainder register 116. The remainder register 116 is coupled to control logic 118 which is used, inter alia, to examine the contents of the remainder register 116 after each cycle of the division operation performed in divider 38 and to determine whether the contents of the remainder register 116 are less than zero or greater than or equal to zero. If the contents of the remainder register are greater than or equal to zero, then a one is provided by the control logic 118 on line 118a and the one which represents a quotient bit is then loaded into the remainder register 116. The MSBs of the partial remainder are decoded to determine the shift required to normalize the partial remainder and to determine whether to add or subtract the divisor in the next operation. This function is generally performed by control logic 118, that is, the control logic examines the partial remainder to determine whether the partial remainder was less than zero. If the partial remainder was less than zero and can be normalized by a left shift of 4 places or less, on the next operation the divisor is added to the remainder. If the partial remainder was greater than zero and can be normalized by a shift of 4 or less places, on the next operation the divisor is subtracted from the remainder. If a left shift of 4 is insufficient to normalize the partial remained, neither an add or subtract is performed since the magnitude of the shifted remainder is known to still be less that the magnitude of the divisor.

Moreover, the control logic 118 determines the length of the normalizing shift, a left shift 1 to 4 places as necessary.

If, for example, the MSB's of the partial remainder are decoded and determined to be ≦−1/16, the divisor is added to the normalized remainder. If on the other hand, the remainder was greater than ≧1/16 the divisor is subtracted form the normalized remainder. If the control logic also determines that the partial remainder is −1/16<partial remainder<1/16 and cannot be normalized with a shift left of 4, the maximum shift, then the partial remainder is passed through the adder by selecting a zero instead of ±the divisor.

The number of quotient bits developed for each iteration is equivalent to the shift amount used to normalize the partial remainder. Thus, if the bit is shifted three positions, then three quotient bits have been determined during that division cycle. The first quotient bit developed for each iteration is the inversion of a sign bit for the partial remainder if the remainder is the result of an addition or subtraction of the divisor. If the partial remainder is the result derived from a no-op which is continuing a normalization shift from a previous iteration, the leading quotient bit for this iteration is the same as the sign bit for the partial remainder. When a normalization shift of two, three or four is performed, quotient bits two through four for this iteration are the same as the partial remainder sign bit. Table 2 below describes the quotient bits for different partial remainders and sign bits as shown.

TABLE 3

| Lead Quotient Bit | Shift required |
|---|---|
| A2 | 0 |
| A1 | 1 |
| A0 | 2 |
| hidden bit (B0) | 3 |

When the leading bit of the quotient reaches the B4 bit position of the quotient register, the signal DIV_DONE_SOON is asserted to the instruction unit's issue control logic. Assertion of DIV_DONE_SOON indicates to the instruction control logic that the division operation will complete and the alignment shift can be done before the quotient is ready for rounding even if the remaining quotient bits are developed at only one quotient bit per cycle for the completion of the division operation. A quotient register shift of zero is performed on cycles following the alignment shift if the quotient is completed before the slot in the pipeline is available in which the quotient register is input to the round adder. When a quotient register is input to the round adder, the A2 quotient bit maps to the B0 bit position of the adder input. The sign of the initial dividend minus the

TABLE 2

| partial remainder | | | | | | | | | Quotient last | last |
|---|---|---|---|---|---|---|---|---|---|---|
| a0. | b0 | b1 | b2 | b3 | b4 | Shift | Divisor | Effective Operation | add/sub | NOP |
| 0. | 0 | 1 | x | x | x | shf 1 | −D | 2*partial_rem − divisor | 1 | 0 |
| 0. | 0 | 0 | 1 | x | x | shf 2 | −D | 4*partial_rem − divisor | 1 0 | 0 0 |
| 0. | 0 | 0 | 0 | 1 | x | shf 3 | −D | 8*partial_rem − divisor | 1 0 0 | 0 0 0 |
| 0. | 0 | 0 | 0 | 0 | 1 | shf 4 | −D | 16*partial_rem − divisor | 1 0 0 0 | 0 0 0 0 |
| 0. | 0 | 0 | 0 | 0 | 0 | shf 4 | 0 | 16*partial_rem − divisor | 1 0 0 0 | 0 0 0 0 |
| 1. | 1 | 1 | 1 | 1 | 1 | shf 4 | 0 | 16*partial_rem − divisor | 0 1 1 1 | 1 1 1 1 |
| 1. | 1 | 1 | 1 | 1 | 0 | shf 4 | +D | 16*partial_rem − divisor | 0 1 1 1 | 1 1 1 1 |
| 1. | 1 | 1 | 1 | 0 | x | shf 3 | +D | 8*partial_rem − divisor | 0 1 1 | 1 1 1 |
| 1. | 1 | 1 | 0 | x | x | shf 2 | +D | 4*partial_rem − divisor | 0 1 | 1 1 |
| 1. | 1 | 0 | x | x | x | shf 1 | +D | 2*partial_rem − divisor | 0 | 1 |

The quotient register 120 comprises sufficient bit storage positions for a round bit, the number of fraction bits needed for a double precision data type, a hidden bit position and three additional upper bit positions A0 to A2 as shown in FIG. 9. The quotient register 120 is cleared at the beginning of a division cycle and shifts from one to four bits each cycle, the same shift which is required to normalize a partial remainder in the previous phase, and the quotient bits shifted into the quotient register are either at the double precision or single precision round bit positions. The sign bit for the initial dividend minus divide/subtraction is saved from the divider. If the first remainder result is positive, a one is the first quotient bit inserted into the quotient register. If the first remainder is negative, then a one is a second quotient bit inserted since the quotient is less than one-half for a normalized divisor and dividend. Once a one is detected by circuit 129 in a hidden bit position or in any of the other three additional upper bit positions of the quotient register, sufficient quotient bits have been determined and a division-done signal is sent out to the control logic 118.

The next cycle shift of the quotient bits is determined by the position of the leading one in the quotient register when DIVISION_DONE is asserted it no longer follows the partial remainder shift amount. An alignment shift is done as set forth in Table 3 below.

divisor (subtraction being positive) indicates the quotient is greater than one and is used to select the exponent.

The alignment shift can be implemented so that the magnitude of the exponent is preserved allowing the rounding logic to work with either a quotient greater than one or a quotient less than one. An additional extra bit position A3 is required and an extra quotient bit is developed. This alignment shift is performed as shown in Table No. 4

TABLE 4

| Lead Quotient Bit | Shift |
|---|---|
| A3 | 0 |
| A2 | 0 if 1st REM <0, 1 if 1st REM >0 |
| A1 | 1 if 1st REM <0, 2 if 1st REM >0 |
| A0 | 2 if 1st REM <0, 3 if 1st REM >0 |

Thus, the quotient is provided from bits B50 to A3 with bits B53 to B51 being ignored.

The above-described implementation of the alignment shift logic allows the division operation to complete without altering the decode logic for the next partial remainder which is the critical delay path for the normalize shift method of division. Changing the quotient's register controls as the final quotient bits are formed is also a critical path. Using a shifter which is already required in forming a quotient avoids requiring the output for the quotient register to position the quotient for rounding and allows the alignment to proceed in the cycle following the completion of the quotient formation.

Having described preferred embodiments of the invention, it will now become apparent to one of ordinary skill in the art that other embodiments incorporating its concept may be used. Thus, it is felt that the invention should not be limited to the disclosed embodiments but rather should be only limited by the spirit and scope of the appended claims.

What is claimed is:

1. A method of predicting a normalization shift amount for a result of a combination of a first operand and a second operand comprises the step of:

determining for fractional portions of said first and second operands which are to be added or subtracted, at least one of a trigger and a borrow position which qualify as a shift point in accordance with a predicted exponent difference between said first and second operands.

2. The method as recited in claim 1 wherein said operands are floating point operands and the determining step further includes the steps of:

determining a first vector for the first operand having an exponent equal to an exponent of the second operand, a second vector for the first operand having an exponent greater than the exponent of the second operand, and a third vector for the first operand having an exponent less than the exponent of the second operand said vectors containing potential trigger shift points; and selecting one of the vectors corresponding to a true trigger shift point in accordance with the predicted exponent difference.

3. The method as recited in claim 2 further comprising the step of:

stripping each set bit of the selected shift vector appearing in bit positions subsequent to a first set bit position of the selected shift vector to provide a stripped shift vector.

4. The method as recited in claim 3 further comprising the step of:

encoding the stripped shift vector to provide a value corresponding to an expected exponent adjustment value.

5. The method as recited in claim 1 wherein the step of determining comprises the step of setting the $i_{th}$ bit position in a shift vector to a logic 1 for the $i_{th}$ bit position in the first operand which is a trigger position and where the $i_{th}+1$ bit position in the first operand is a neutral position or where the $i_{th}$ bit position in the first operand is a borrow position and the $i_{th}+1$ position in the first operand is not a neutral position and is not a borrow position.

6. The method as recited in claim 5 wherein the step of determining further includes the steps of setting the $i_{th}$ bit position in a second shift vector to a logic 1 for the $i_{th}$ bit position in the second operand which is a trigger position and where the $i_{th}+1$ bit position in the second operand is a neutral position or where the $i_{th}$ bit position in the second operand is a borrow position and the $i_{th}+1$ position is not a neutral position and the $i_{th}-1$ position is not a borrow position.

7. An apparatus comprising:

means for providing a first shift vector by examining each corresponding bit position of first and second operands, operand A and operand B, to ascertain a trigger or borrow position on a bit-by-bit basis that qualify as a true left shift point in the first shift vector assuming that the first and second operands have equal exponents;

means for providing a second shift vector by examining each corresponding bit position of the first and second operands to ascertain a trigger or borrow position on a bit-by-bit basis that qualify as a true left shift point in the second shift vector assuming the first and second operands have exponents that are not equal; and means for selecting between said shift vectors in accordance with a signal related to a predicted exponent difference between the first and second operands.

8. The apparatus, as recited in claim 7, wherein said means for providing a second shift vector comprises:

means for determining the second shift vector for an exponent difference corresponding to the exponent of the first operand being greater than the exponent of the second operand; and means for determining a third shift vector for an exponent difference corresponding to the exponent of the second operand being greater than the exponent of the first operand.

9. The apparatus, as recited in claim 8, wherein the means for determining the first shift vector for the input operands having equal exponents comprises:

a combinatorial logic network operative on a fractional part of the input operand and which determines a trigger or borrow position corresponding to one or more bit positions of said fractional part of the input operand, comprising:

means for logically ANDing bits of the input operands A and !B and !A and B at each of their $i_{th}$ positions with the logical exclusive OR of input operands A and B at the $i_{th}+1$ positions to provide logical products;

means for logically ORing the logical products from said ANDing means providing either a potential borrow (B) or a trigger (T); and means for logically ANDing potential borrows and triggers with each respective logical product !A B and A !B to provide a pair of detector signals for each bit position; and means for logically ORing said pair of detector signals to provide the value of the <i>th bit position in the shift vector.

10. The apparatus of claim 9 wherein said combinatorial logic implements the following rules, for the tractional part of the operand A assumed to be greater than the fractional part of the operand B, a bit position "I" is a trigger (T) position, that is, a <I>=1, b<i>=0 and bit position I+1 is a neutral (N) position, that is, the bit positions are equal, or bit position I is a borrow (B), that is, a <I>=1, b <I>=1 and bit position I+1 is not neutral (N) and bit position I−1 is not a borrow (B), that is, (not a<i−1>=0, b<i−1>=1); and for the fractional part of the operand B being larger that the fractional part of the operand A, the bit position <I> is a trigger (T) (a <I>=0, b<i>=1) and bit position I+1 is neutral (N), that is, a<i+1>=b<i+1> or bit position I is a borrow (B), that is, a <I>=1, b <I>=0 and bit position <I+1> is not neutral (N) (a <I+1>=b <I+1> and bit position <i−1> is not a borrow (B), that is, not a<i−1>=1, b<i−1>=0.

11. The combinatorial logic network, as recited in claim 9, wherein the combinatorial logic network determines for a bit position that is a trigger and a preceding bit position that is neutral or a bit position that is a borrow and a subsequent bit position that is not neutral and is not a borrow.

12. A method of predicting a normalization shift amount for an operand comprises the steps of:

providing a plurality of vectors each comprised of a plurality of bit positions with each bit position corresponding to bit positions of mantissa portions of first and second operands which are to be added or subtracted, said plurality of vectors having bits which indicate a trigger and a borrow position which qualify as a potential left-shift point for when the first operand has an exponent equal to the second operand, the first operand has an exponent greater than the second operand, and the first operand having an exponent less than the second operand; and selecting one of the vectors corresponding to the true trigger left shift point in accordance with a predicted exponent difference determined from the exponents of the first and second operands.

13. The method as recited in claim 12 further comprising the step of:

stripping each set bit of the selected shift vector appearing in bit positions subsequent to a first set bit position of the selected shift vector to provide a stripped shift vector.

14. The method as recited in claim 13 further comprising the step of:

encoding the stripped shift vector to provide a value corresponding to an expected exponent adjustment value.

15. The method as recited in claim 14 wherein the step of providing comprises the step of:

setting the $i_{th}$ bit position in a shift vector to a logic 1 for the $i_{th}$ bit position in the first operand which is a trigger position and where the $i_{th}+1$ bit position in the first operand is a neutral position or where the $i_{th}$ bit position in the first operand is a borrow position and the $t_{th}+1$ position in the first operand is not a neutral position and is not a borrow position.

16. The method as recited in claim 15 wherein the step of determining further includes the steps of setting the $i_{th}$ bit portion in the shift vector for the $i_{th}$ position in the second operand which is a trigger and where the $i_{th}+1$ bit position is a neutral position or the $i_{th}$ bit position in the operand is a borrow position and the $i_{th}+1$ position is not neutral and the $i_{th}-1$ position is not a borrow.

17. An apparatus comprising:

a combinatorial logic network operative on each bit position of fractional parts of first and second floating point operands, operand A and operand B, to determine trigger or borrow positions that qualify as a potential true normalization shift point for a mantissa portion of a calculated result of the two operands.

18. The apparatus, as recited in claim 17, wherein said combinatorial logic circuit comprises:

a first circuit to produce a first shift vector for an exponent difference corresponding to the exponent of the operand A being equal to the exponent of the operand B;

a second circuit to produce a second shift vector for an exponent difference corresponding to the exponent of the operand A being greater than the exponent of the operand B; and a third circuit producing a third shift vector for an exponent difference corresponding to the exponent of the operand B being greater than the exponent of the operand A;

means for selecting one of the first, second and third shift vectors in accordance with an exponent difference between the operands.

19. The apparatus, as recited in claim 18, wherein the circuit to produce the shift vector for the input operands having equal exponents comprises:

logic circuits for logically ANDing the input operands A and !B and !A and B at each of their $i_{th}$ positions with the logical exclusive OR of input operands A and B at the $i_{th}+1$ positions;

logic circuits for logically ORing products from said ANDing logic circuits for providing either a potential borrow (B) or a trigger (T); and logic circuits for logically ANDing the potential borrows and triggers with each respective logical product !A B and A !B to provide a pair of detector signals for each bit position; and logic circuits for ORing said pair of detector signals to provide the value of the <i>th bit position in the shift vector.

20. The apparatus of claim 19 wherein said combinatorial logic implements the following rules, for the fractional part of the operand A assumed to be greater than the fractional part of the operand B, a bit position "I" is a trigger (T) position, that is, a<i>=1, b<i>=0 and bit position I+1 is a neutral (N) position, that is, the bit positions are equal, or bit position I is a borrow (B), that is, a<i>=1, b<i>=1 and bit position I+1 is not neutral (N) and bit position I−1 is not a borrow (B), that is, (not a<i−1>=0, b<i−1>=1); and for the fractional part of the operand B being larger than the fractional part of the operand A, the bit position <I>is a trigger (T) (a<i>=0, b<i>=1) and bit position I+1 is neutral (N), that is, a<i +1>=b<i+1> or bit position I is a borrow (B), that is, a<i>=1, b<i>=0 and bit position <I+1>+is not neutral (N) (a<i+1>=b<i+1>) and bit position <I−1> is not a borrow (B), that is, not a<i−1>=1, b<i−1>=0.

21. The circuit, as recited in claim 19, wherein the circuit determines a set value for the vector corresponding to a bit position in the first operand that is a trigger and a preceding bit position that is neutral or a bit position that is a borrow and a subsequent bit position that is not neutral and is not a borrow.

* * * * *